US012283998B2

(12) United States Patent
Brodsky et al.

(10) Patent No.: US 12,283,998 B2
(45) Date of Patent: Apr. 22, 2025

(54) METHOD AND APPARATUS FOR MAPPING OUT SOURCES OF DECOHERENCE IN QUANTUM CHANNELS

(71) Applicant: U.S. Army DEVCOM, Army Research Laboratory, Adelphi, MD (US)

(72) Inventors: Michael Brodsky, Millburn, NJ (US); Cristian Antonelli, Sulmona (IT); Daniel E. Jones, Nottingham, MD (US); Gabriele Riccardi, Rome (IT)

(73) Assignee: The United States America as represented by the Secretary of the Army, Washington, DC (US)

( * ) Notice: Subject to any disclaimer, the term of this patent is extended or adjusted under 35 U.S.C. 154(b) by 193 days.

(21) Appl. No.: 18/100,857

(22) Filed: Jan. 24, 2023

(65) Prior Publication Data
US 2023/0261762 A1    Aug. 17, 2023

Related U.S. Application Data

(60) Provisional application No. 63/302,373, filed on Jan. 24, 2022.

(51) Int. Cl.
*H04B 10/70* (2013.01)
*H04B 10/079* (2013.01)

(52) U.S. Cl.
CPC ........... *H04B 10/70* (2013.01); *H04B 10/079* (2013.01)

(58) Field of Classification Search
CPC ............................. H04B 10/70; H04B 10/079

USPC ........................................................ 398/25
See application file for complete search history.

(56) References Cited

U.S. PATENT DOCUMENTS

| 10,693,565 | B2 | 6/2020 | Kirby et al. | |
| 11,193,750 | B1 * | 12/2021 | Fertig | G01S 19/23 |
| 2016/0164615 | A1 * | 6/2016 | Dailey | H04B 10/70 |
| | | | | 398/149 |
| 2019/0349094 | A1 * | 11/2019 | Santra | G02B 23/04 |
| 2020/0274703 | A1 * | 8/2020 | Lukens | H04L 9/0858 |

FOREIGN PATENT DOCUMENTS

| CN | 215575770 U | * | 1/2022 | |
| EP | 3917074 A1 | * | 12/2021 | ............ H04B 10/70 |
| JP | 2020028076 A | * | 2/2020 | ............ A61B 17/22 |
| WO | WO-2021067631 A1 | * | 4/2021 | ......... G01B 9/02017 |
| WO | WO-2024173939 A1 | * | 8/2024 | |

OTHER PUBLICATIONS

Jones et al; Exploring classical correlations in noise to recover quantum information using local filtering; Jul. 2020; pp. 1-14. (Year: 2020).*

(Continued)

*Primary Examiner* — Amritbir K Sandhu
(74) *Attorney, Agent, or Firm* — Eric B. Compton

(57) ABSTRACT

Systems, apparatus and methods for defining an impairment profile along a polarization quantum channel such as in terms of modal loss and decoherence. The disclosed impairment profile or characterization methods may be used as part of a tool such as to inform a network operator of a weakest span of the communication channel, thus facilitating optimal signal routing decisions.

15 Claims, 8 Drawing Sheets

(56) References Cited

OTHER PUBLICATIONS

D. E. Jones, B. T. Kirby, G. Riccardi, C. Antonelli, M. Brodsky, "Exploring classical correlation in noise to recover quantum information using local filtering," New Journal of Physics, 22, 073037, Jul. 2020.
Gabriele Riccardi, Cristian Antonelli, Daniel E. Jones, and Michael Brodsky, "Simultaneous Decoherence and Mode Filtering in Quantum Channels: Theory and Experiment," Physical Review Applied, 15, 014060 (2021).

* cited by examiner

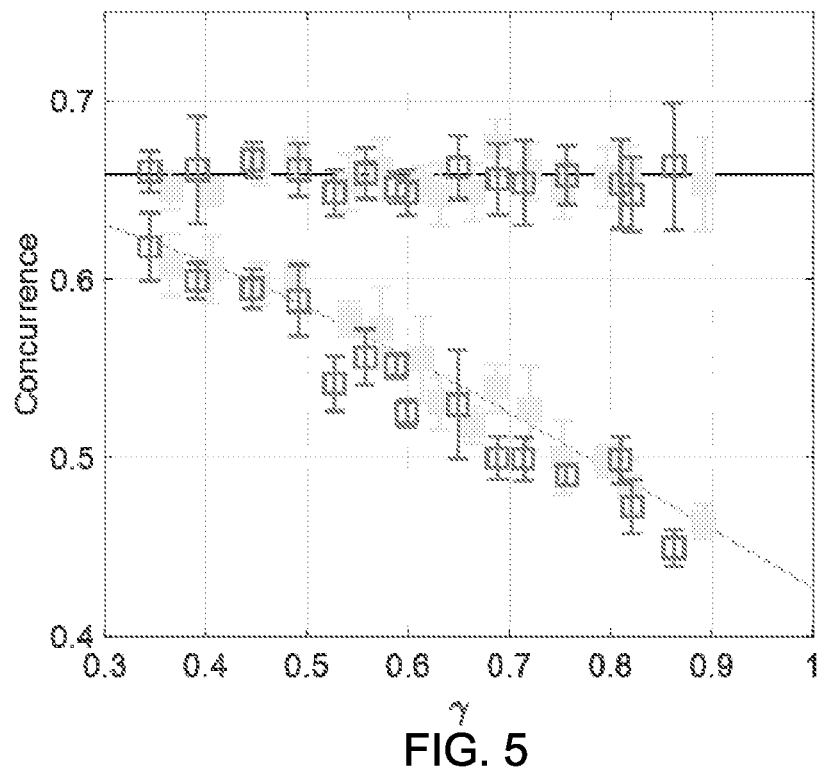
FIG. 5
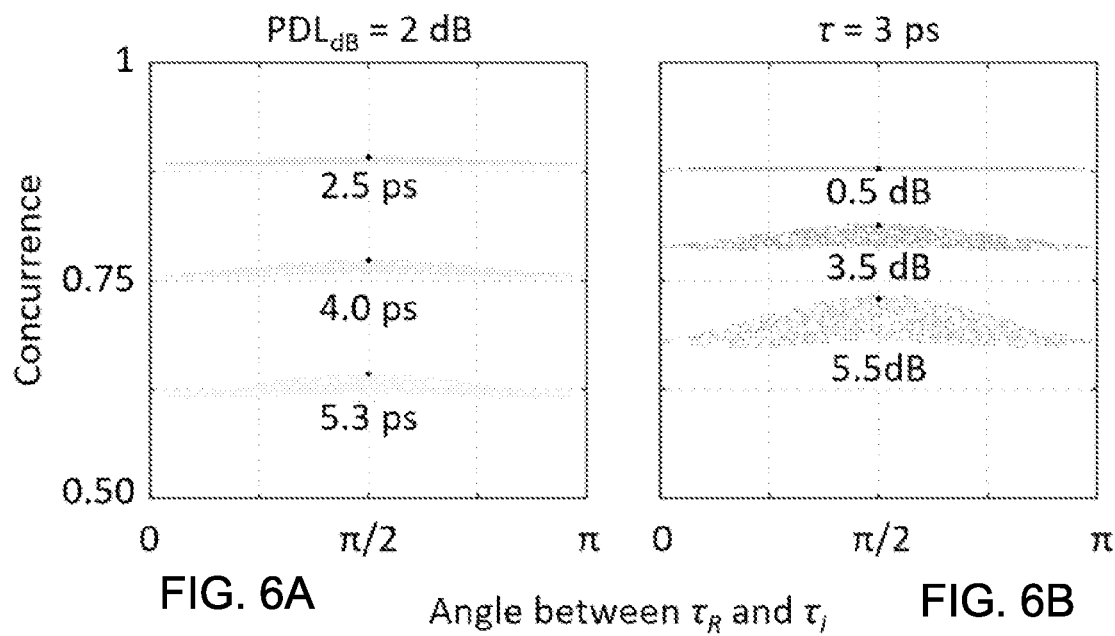
FIG. 6A  Angle between $\tau_R$ and $\tau_i$  FIG. 6B

OPTICAL TRANSMISSION CHANNEL CHARACTERIZATION

- 710 GENERATING, USING AN ENTANGLED PHOTON SOURCE (EPS), PAIRS OF ENTANGLED PHOTONS

- 720 COUPLING FIRST (A) ENTANGLED PHOTONS OF THE GENERATED PAIRS (AB) OF ENTANGLED PHOTONS ARE COUPLED TO A FIRST (TRANSMISSION) OPTICAL CHANNEL AND SECOND (B) ENTANGLED PHOTONS OF THE GENERATED PAIRS (AB) OF ENTANGLED PHOTONS ARE COUPLED TO A SECOND (LOCAL STORAGE) OPTICAL CHANNEL

- 730 DETECTING, AT EACH OF THE FIRST AND SECOND CHANNELS, RESPECTIVE ENTANGLED PHOTONS
  EACH ENTANGLED PHOTON A EXPRESSED IN BASIS ($h_A$, $h_{A'}$)
  EACH ENTANGLED PHOTON B EXPRESSED IN BASIS ($h_B$, $h_{B'}$)

- 740 DETERMINING QUANTUM COINCIDENCE DATA (QCD) OF DETECTED ENTANGLED PHOTONS (A) AND (B)

- 750 MEASURING QUANTUM-CORRELATION ALONG ($h_A$, $h_{B'}$) AND ($h_{A'}$, $h_B$) OF THE DETECTED ENTANGLED PHOTONS USING THE DETERMINED QCD

- 760 RESPONSIVE ($h_A$, $h_{B'}$) > ($h_{A'}$, $h_B$) CHARACTERIZING THE FIRST CHANNEL AS A MODAL LOSS FIRST CHANNEL

- 770 RESPONSIVE TO ($h_A$, $h_{B'}$) < ($h_{A'}$, $h_B$) CHARACTERIZING THE FIRST CHANNEL AS A DECOHERENCE FIRST CHANNEL.

- 780 OPTIONALLY CONFIGURING SECOND (LOCAL STORAGE) OPTICAL CHANNEL TO INCLUDE MODAL LOSS COMPENSATING FILTERING).

- 790 OPTIONALLY REPEATING STEPS 710-780 FOR EACH OF A PLURALITY OF AVAILABLE TRANSMISSION CHANNELS SO AT TO PREFERENTIALLY SELECT AN OUTPUT CHANNEL FOR TRANSMISSION

FIG. 7   700

```
┌─────────────────────────────────────────────────────────────────────┐
│ AT EACH OPTICAL NODE N WITHIN AN OPTICAL NETWORK COMPRISING A       │
│ PLURALITY OF OPTICAL NODES, IDENTIFYING PREFERRED OPTICAL            │
│ TRANSMISSION PATH(S) AS THOSE PATHS CHARACTERIZED AS MODAL           │
│ LOSS FIRST OPTICAL CHANNELS (OPTIONALLY PROVIDE LOCAL OPTICAL        │
│ CHANNEL MODAL LOSS COMPENSATION)                                910  │
└─────────────────────────────────────────────────────────────────────┘
                                   ↓
┌─────────────────────────────────────────────────────────────────────┐
│ AT A SOURCE OPTICAL NODE NS, TRANSMITTING A FIRST ENTANGLED          │
│ PHOTON $A_{NS}$ TOWARD NEXT OPTICAL NODE (N+1) VIA A PREFERRED       │
│ OPTICAL PATH WHILE KEEPING A SECOND ENTANGLED PHOTON $B_{NS}$   920  │
└─────────────────────────────────────────────────────────────────────┘
                                   ↓
┌─────────────────────────────────────────────────────────────────────┐
│ AT EACH INTERMEDIATE OPTICAL NODE N:                                 │
│                                                                      │
│ • RECEIVING AN ENTANGLED PHOTON $A_{N-1}$ FROM A PRECEDING NODE      │
│   (SOURCE OR INTERMEDIATE)                                           │
│                                                                      │
│ • PERFORMING A BELL STATE MEASUREMENT ON THE KEPT                    │
│   INTERMEDIATE NODE PHOTON $B_N$ AND THE RECEIVED PHOTON $A_{N-1}$ TO│
│   ENTANGLE THEREBY TRANSMITTED INTERMEDIATE NODE N PHOTON            │
│   $A_N$ AND PRECEDING NODE PHOTON $B_{N-1}$                     930  │
└─────────────────────────────────────────────────────────────────────┘
                                   ↓
┌─────────────────────────────────────────────────────────────────────┐
│ AT A DESTINATION OPTICAL NODE ND:                                    │
│                                                                      │
│ • RECEIVING AN ENTANGLED PHOTON $A_{N-1}$ FROM A PRECEDING NODE      │
│   (SOURCE OR INTERMEDIATE)                                           │
│                                                                      │
│ • PERFORMING A BELL STATE MEASUREMENT ON THE KEPT                    │
│   DESTINATION NODE PHOTON $B_{ND}$ AND THE RECEIVED PHOTON $A_{N-1}$ TO│
│   ENTANGLE THEREBY DESTINATION NODE N PHOTON $A_{ND}$ AND            │
│   PRECEDING NODE PHOTON $B_{N-1}$                                    │
│                                                                      │
│ • WHEREIN A CONNECTION IS ESTABLISHED BETWEEN SOURCE NODE            │
│   NS AND DESTINATION NODE ND BY THE ENTANGLEMENT OF                  │
│   DESTINATION NODE PHOTON $A_{ND}$ AND SOURCE NODE NS STORED         │
│   PHOTON $B_{NS}$ (AND ANY INTERMEDIATE NODE STORED PHOTONS $B_{(NS+1)}$│
│   THROUGH $B_{(ND-1)}$)                                         940  │
└─────────────────────────────────────────────────────────────────────┘
```

FIG. 9        900

METHOD AND APPARATUS FOR MAPPING OUT SOURCES OF DECOHERENCE IN QUANTUM CHANNELS

CROSS REFERENCE TO RELATED APPLICATION

This application claims the benefit of provisional patent application Ser. No. 63/302,373, filed on Jan. 24, 2022, and entitled METHOD AND APPARATUS FOR MAPPING OUT SOURCES OF DECOHERENCE IN QUANTUM CHANNELS, which provisional patent application is incorporated herein by reference.

GOVERNMENT INTEREST

The invention described herein may be manufactured and used by or for the Government of the United States for all governmental purposes without the payment of any royalty.

FIELD OF THE DISCLOSURE

The present disclosure relates generally to a method and apparatus for mapping out sources of decoherence in quantum channels.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Reconfigurable quantum networks are believed to offer solutions to several challenges in communication security, network intrusion detectability, stealth reconnaissance, and sensing. All these potential applications depend on the network ability to entangle remote nodes by utilizing some entanglement-distribution system.

Quantum networks require robust quantum channels for fast and reliable entanglement distribution over long distances. As quantum communication technology matures, it moves towards utilizing actual fibers and free space optical channels, hence there is a growing need for physical models describing decoherence in fibers and in a turbulent atmosphere.

Previous system characterization techniques rely on additional channel characterization equipment and measurement protocols that need to be time-multiplexed with the transmission of quantum signals, thereby increasing the complexity and decreasing the efficiency of quantum communications. And, as time-dependent quantum channel impairments degrade the overall quality of transmitted entangled states, it remains unclear which part of the network may have degraded the most. Improvements are desired.

SUMMARY OF THE INVENTION

Various deficiencies in the prior art are addressed below by the disclosed systems, methods and apparatus configured for defining an impairment profile along a polarization quantum channel such as in terms of modal loss and decoherence. The disclosed impairment profile or characterization methods and systems may be used as part of a tool such as to inform a network operator of a weakest span of the communication channel, thus facilitating optimal signal routing decisions.

In one embodiment, a method of characterizing an optical channel comprises generating, using an entangled photon source (EPS), pairs of entangled photons, wherein first entangled photons A of the generated pairs of entangled photons are coupled to a first optical channel and second entangled photons B of the generated pairs of entangled photons are coupled to a second optical channel, wherein the first channel comprises an optical channel to be characterized and the second channel comprises a local storage optical channel; detecting, at each of the first and second channels, respective entangled photons, wherein each entangled photon A is expressed in the basis $(h_A, h_{A'})$ and each corresponding entangled photon B is expressed in the basis $(h_B, h_{B'})$; determining quantum coincidence data (QCD) of detected entangled photons A and B; measuring quantum-correlation along $(h_A, h_{B'})$ and $(h_{A'}, h_B)$ of the detected entangled photons using the determined QCD; and responsive to $(h_A, h_{B'})$ being greater than $(h_{A'}, h_B)$, characterizing the first channel as a modal loss first channel; responsive to $(h_A, h_{B'})$ being less than $(h_{A'}, h_B)$, characterizing the first channel as a decoherence first channel. Responsive to the first channel comprising a modal loss first channel, the second channel may have included therein a filtering element configured to compensate for modal loss.

In the case of a node in a network, preferential selection for use in transmission thereat may be given to modal loss first transmission channels. In the case of the node not having any modal loss first transmission channels, preferential selection for use in transmission thereat may be given to a decoherence first channel exhibiting a lowest amount of decoherence.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

FIGS. 4A, 4B, 4C, 4D, 4E, 4F and 4G graphically depict experimental results useful in understanding the embodiments;

FIG. 5 graphically illustrates concurrence as a function of the filtering magnitude γ in filtering-first scenario embodiments;

FIGS. 6A and 6B graphically illustrate concurrence as a function of the angle formed by real and imaginary components of t;

FIG. 7 depicts a flow diagram of an optical channel characterization method according to various embodiments;

FIG. 9 depicts a flow diagram of method for establishing a connection between a source node NS and a destination node ND within an optical mesh network in accordance with an embodiment.

Figure 1:
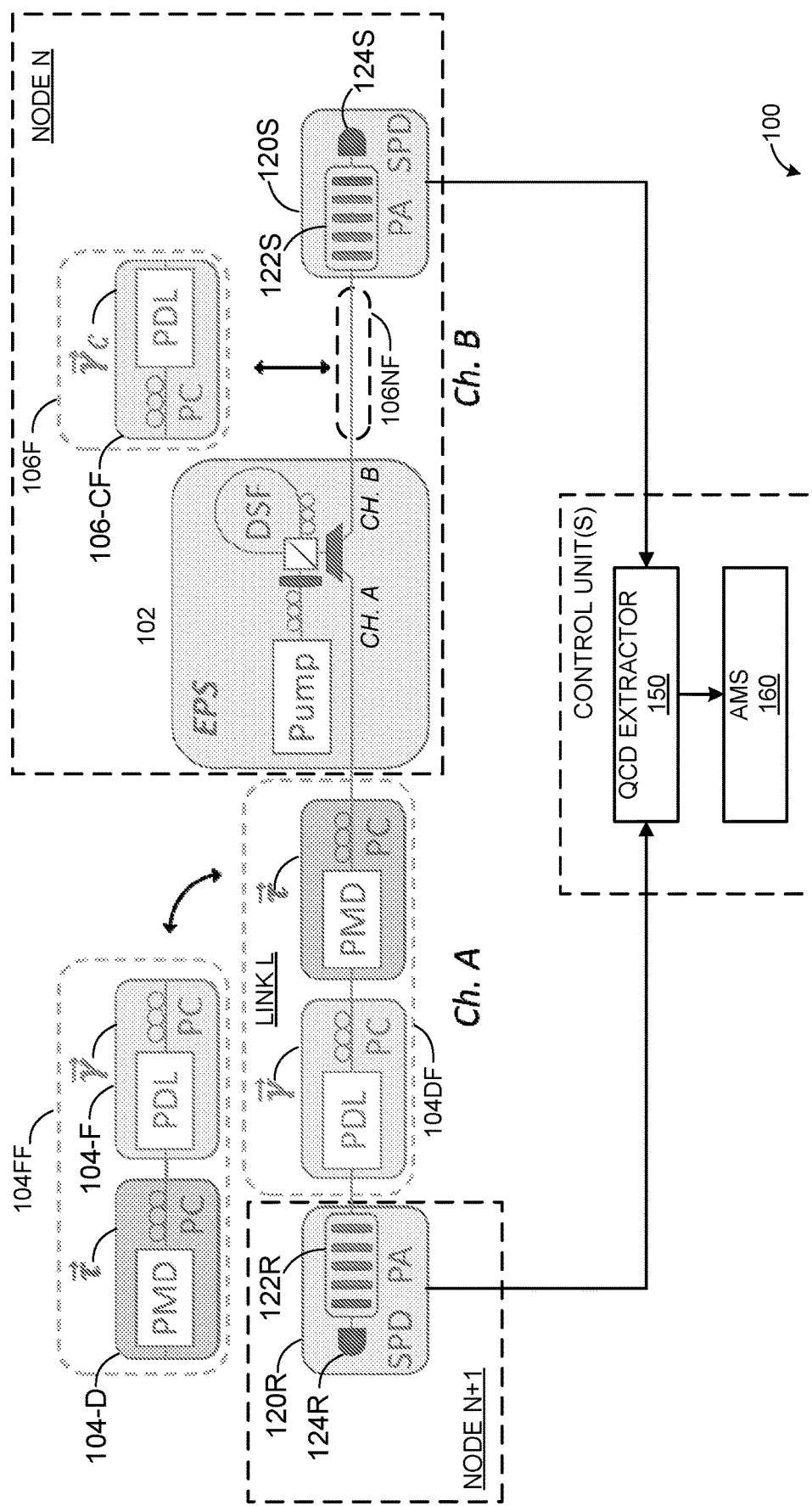
FIG. 1 depicts a node of an exemplary quantum communications apparatus which may be used for practicing the invention according to embodiments.
Figure 2A:
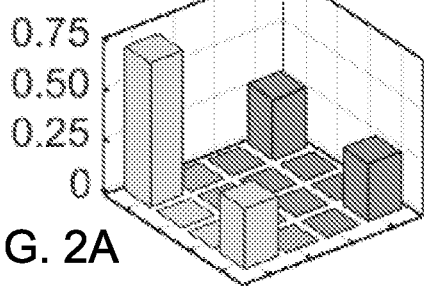
FIGS. 2A, 2B, 2C, 2D, 2E, 2F, 2G and 2H graphically depict theoretical (left) and experimental (right) information useful in understanding the embodiments.
Figure 2B:
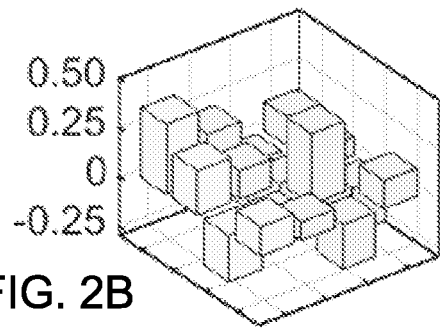
Figure 2C:
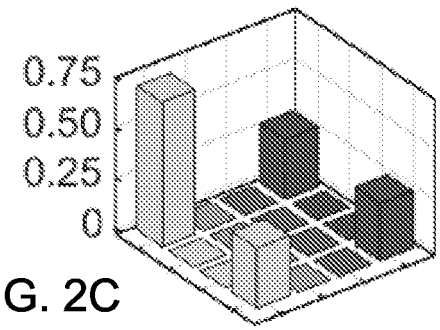
Figure 2D:
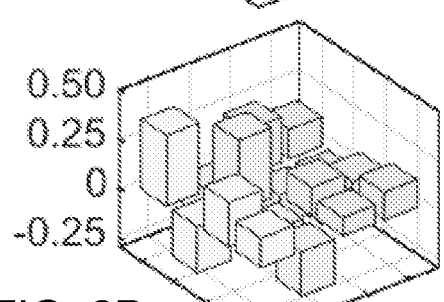
Figure 2E:
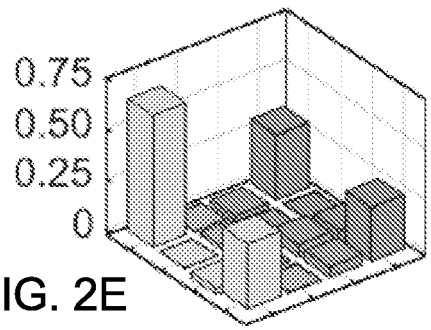
Figure 2F:
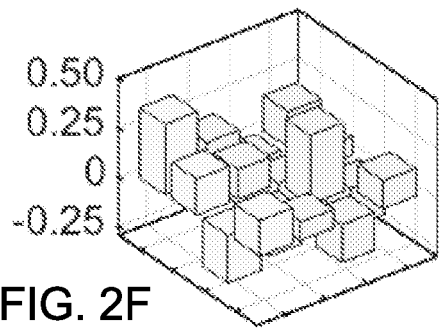
Figure 2G:
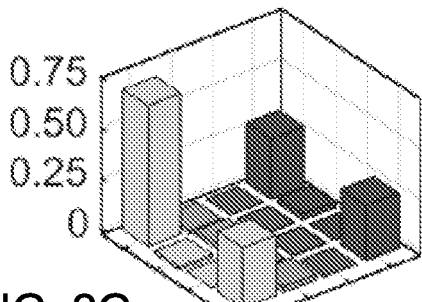
Figure 2H:
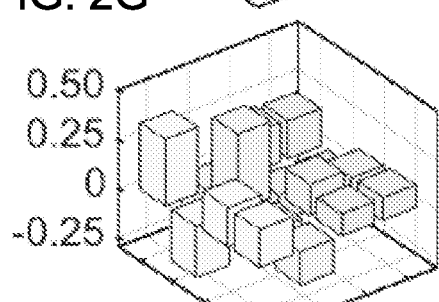

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments, such as seismology and data fusion.

Quantum networks offer unprecedented capabilities in secure communications, distributed computation, and sensing. The operation of quantum networks relies on their ability to reliably "entangle" remote nodes, a function that is achieved by distributing entangled photon states over the network and by storing the entanglement at each node by means of quantum memories. The quality of entanglement could suffer during transmission due to inherent and time-varying properties of quantum transmitting channels. For a given network topology, a knowledge of which channel is going down is essential for preserving the overall network connectivity.

Quantum networks require robust quantum channels for fast and reliable entanglement distribution over long distances. As quantum communication technology matures, it moves towards utilizing actual fibers and free space optical channels, hence there is a growing need for physical models describing decoherence in fibers and in a turbulent atmosphere.

One challenge is to concisely account for numerous elements distributed along a lengthy optical path. By starting with an analytical model of a channel with just two lumped elements, one representing decoherence and the other representing mode filtering. Interestingly, it is found that while the order and relative orientation of the two elements produce a wealth of different bi-photon states, the amount of entanglement in all those states is exactly the same. Experiments were conducted that implement this channel and verify the analytical findings. Finally, the analysis is expanded to a general channel, resulting from a statistically significant number of arbitrarily oriented elements. It is shown that over an ample range of parameters, the two-element analytical model is quite accurate in describing the general channel, which makes it an effective tool for gaining insights into channel decoherence.

The inventors have determined an analytical channel model describing the behavior of a general fiber polarization quantum channel and accurate over a wide range of parameters. Quantum correlations measured over distributed photon states may be associated or connected with inherent properties of the quantum channel to provide in-situ channel characterization capabilities and network diagnostic techniques, which provide useful information such as for enabling effective routing decisions and the like.

The inventors have determined that time-varying quantum-channel impairments affecting distribution of the entangled photons manifest themselves in a particular way in the relative strength of four Clauser-Horne-Shimony-Holt (CHSH) quantum correlations. Thus, by measuring these correlations in real time, a network operator can potentially obtain much of the needed information about the quantum channels, and further use this information towards making network routing decisions.

The various embodiments are well suited to addressing various problems associated with quantum network diagnostics, such as the problem of time-dependent quantum channel impairments degrading overall quality of transmitted entangled states wherein it is difficult to determine which part of the network have degraded the most.

Various embodiments provide novel methods, tools, apparatus, and the like suitable for use in configuring and operating a quantum communications system, illustratively to allow a network operator to pinpoint a weakest link in a network, thereby enabling a network reconfiguring decision, direct or indirect compensation, error-corrective measures, and the like. The embodiments may be incorporated into a control unit of the system, such as to provide a tool allowing for in-situ characterization of time-varying quantum communication channels in a quantum network. Operation of a quantum network is likely to include measurements of four specific parameters (CHSH quantum correlations) for network diagnostics, control, and potential error corrections.

Various embodiments provide novel methods, tools, apparatus, and the like to connect the results of quantum-correlation measurements of a two-qubit (e.g., defined by photon polarization, orbital angular momentum, etc.) entangled system that is distributed over a quantum channel to the inherent properties of that quantum communication channel. This knowledge can be used to diagnose which channel deteriorated over time and implement a mitigating rerouting protocol or compensation technique. The model connects these parameters to specific intrinsic impairments of quantum channels thus enabling in-situ channel monitoring capability.

Various embodiments provide an analytical model that computes a two-element model of the communications system that takes into account decoherence and mode filtering. It may be incorporated into an analytical modelling system of the control unit of the communications system.

Various embodiments are directed to defining an impairment profile along a polarization quantum channel such as in terms of modal loss and decoherence. When a pair of photons entangled in their polarization traverses across a quantum network, impairments intrinsic to each quantum channel degrade the overall entanglement quality of the pair. Pre-characterization of network route is not practical as the impairments are dynamic in nature and change with ambient conditions. The disclosed impairment profile or characterization methods and systems may be used as part of a tool such as to inform a network operator of a weakest span of the communication channel, thus facilitating optimal signal routing decisions.

Advantageously, the various embodiments allow for in-situ characterization of time-varying quantum communication channels in a quantum network. Operation of a quantum network is likely to include measurements of four specific parameters (CHSH quantum correlations) for network diagnostics, control, and potential error correction. A model in accordance with the embodiments connects these parameters to specific intrinsic impairments of quantum channels, thus enabling in-situ channel monitoring capability. The various embodiments include methods and apparatus for in-situ monitoring.

Various embodiments provide a comprehensive model describing the joint effect of decoherence and mode filtering on a travelling EPR pair. For polarization-entangled photons transmitted in quantum fiber channels, both effects are generally distributed along the photon path in the form of PMD and PDL. Here, however, start by considering the simple case of just two lumped elements in one channel, one causing decoherence and another causing partial mode filtering. Since environmental changes affect the relative orientation of the corresponding eigenstates on the Bloch sphere, it is useful to explore the effect of the elements' orientation, as well as the impact of the order in which they affect the travelling photon to account for opposite propagation direction.

Also provided is experimental verification of the model in the most illustrative cases and establish peculiar symmetries of the propagated bi-photon states. Then an expansion of the analytical results to model a general fiber-optic channel, where the effect of a multitude of small decoherence and mode-filtering elements accumulates along the route in a random fashion. Then a numerical investigation of the effect of such a general channel and determine boundaries within which it can be reasonably approximated by the much simpler and physically intuitive channel consisting of just two lumped elements.

Various embodiments find particular utility within the context of a quantum communications network, such as an optical mesh network comprising many quantum communications nodes or network elements, wherein each of the many nodes or network elements is connected to at least one other node or network element via a corresponding optical link therebetween (i.e., adjacent nodes or network elements). A connection between a source node and a destination node may traverse many intermediate nodes and links. Within the context of a quantum communications network, such a connection is deemed to have been made when the source node, destination node, and any intermediate nodes share an entangled photon pair.

Each node or network element N has an ability to generate an entangled pair of photons $A_N$ and $B_N$, keeping one photon (e.g., $B_N$) of the entangled pair locally (e.g., in a local storage channel or mechanism) while sending the other photon (e.g., $A_N$) of the entangled pair to a next node (N+1) via an optical link or transmit channel (from the perspective of node N) therebetween, and while receiving a photon $A_{N-1}$ from a prior node (N−1) via an optical link or receive channel (from the perspective of node N) therebetween. The next node (N+1) performs a Bell State Measurement on its kept photon $B_N$ and the received photon $A_{N-1}$, destroying those two photons and entangling the photon $B_{N-1}$ kept at node N−1, and the photon $A_N$ transmitted by node N to node N+1. In this manner, a source node NS and destination node ND are ultimately deemed to be connected by being in possession of respective entangled photons; namely, photon $B_{NS}$ at the source node NS and photon $A_{ND}$ at the destination node ND (or photon $A_{NS}$ at the source node NS and photon $B_{ND}$ at the destination node ND, depending upon which of the entangled photons is kept and which is transmitted).

Various embodiments are directed to choosing a path for transmitting optical communications/data through a mesh network such that at each of the nodes transmitting such optical communications/data, the optical link or transmit channel selected for such transmission preferentially comprises an optical channel characterized as a modal loss first channel rather than a decoherence loss first channel. In this manner, compensating filtering may be applied to an optical channel used to local keep or retain in a local storage channel one entangled photon (e.g., $B_N$ of an entangled pair of photons $A_N B_N$), while the other entangled photon (e.g., $A_N$ of the entangled pair of photons $A_N B_N$), is transmitted via a modal loss first optical channel benefitting from such compensating filtering.

FIG. 1 depicts an exemplary quantum communications apparatus which may be used for practicing the invention according to embodiments. The communications apparatus 100 of FIG. 1 depicts portions of adjacent nodes or network elements within an optical network supporting quantum communications, illustratively a first or source node N transmitting to a second or destination node N+1 via an optical link L. Generally speaking, each node is configured to receive an optical communication from an input optical channel (possibly one of many input optical channels) and transmit the received optical communication to a selected one of a plurality of output optical channels, wherein the selected output transmission channel is preferably the channel having the most favorable an impairment profile (i.e., modal loss first channel, decoherence first channel having the lowest decoherence if there is no modal loss first channel, etc.).

As shown and described with respect to FIG. 1, a first node N includes an entangled photon source (EPS) 102 for generating pairs of entangled photons $A_N B_N$; a first transmission channel (Ch. A or 104) for receiving one $A_N$ of the pairs $A_N B_N$ of entangled photons and conveying that entangled photon $A_N$ to a receiver of an adjacent node N+1 via the link 104 therebetween; a second transmission channel (Ch. B or 106) for receiving the other $B_N$ of the pairs $A_N B_N$ of entangled photons and conveying that entangled photon $B_N$ to a receiver of the node N via the link 106; a first or received photon detection system (DS) 120R within the second node N+1 configured to receive the entangled photon $A_N$ transmitted by the first node N via the first transmission channel 104, a second or stored photon detection system (DS) 120S within the first node N configured to receive the corresponding entangled photon $B_N$ transmitted by the first node N via the second transmission channel 106; a first control unit 150 configured to extract quantum coincidence data (QCD) from simultaneous detections of the two detection systems 120R/120S; and a second control unit 160 comprising an analytical modelling system (AMS) for characterizing the communications system based on the quantum coincidence measurements, wherein the analytical modelling system computes a two-element model of the communications system that takes into account decoherence and mode filtering. The first 150 and second 160 control units may be implemented as separate control units or as a single control unit.

The entangled photon source 102 may be x(2) or x(3) sources, for instance. The first A and second B channels may be fiber optical channels as non-limiting examples. The entangled photon source 102 outputs photons in the form of pairs of entangled photons. The first transmission channel 104 has an input and an output, and the second transmission channel 106 has an input and an output. At least some photons from the entangled photon source 102 are directed to the input of the first transmission channel 104 for transmission via the first transmission channel 104. At least some other of the photons from the entangled photon source 102 are directed into the input of the second transmission channel 106 for transmission via the second transmission channel 106.

The photons directed to the input of the first transmission channel 104 or transmitted through the first transmission channel 104 are referred to as first channel photons. The photons directed to the input of the second transmission channel 106 or transmitted through the second transmission channel 106 are referred to as second channel photons. At least some of the first channel photons are entangled photons. At least some of the second channel photons are entangled photons that are entangled with a number of the entangled photons in the first transmission channel 104 in accordance with a level of entanglement. The level of entanglement between the entangled photons in each channel at the output of each channel is restored essentially to the level of entanglement between the entangled photons in each channel at the input of each channel as a result of the action of the compensating loss element 108.

The detection systems 120R/120S may include conventional polarization analyzers 122R/122S and photon counters 124R/124S, as typically found in quantum communications systems, and be configured to record timed arrivals of photons of certain orthogonal polarizations h and v. The polarization analyzers 122R/122S may include several waveplates and a polarization beam splitter, wherein the waveplates are electronically controlled such as via computer that controls the entangled photon source 102, polarization analyzers 122R/122S, and detectors 124R/124S in order to perform quantum state tomography, calculate concurrence, and other functions such as discussed herein. It is noted that the detection systems 120R/120S depicted herein may comprise separate detectors 124 for each of the orthogonal horizontal and vertical polarizations of a detected photon.

The first transmission channel 104 and the second transmission channel 106 may be quantum communication channels. In some examples, the first transmission channel 104 may be a fiber-optic quantum channel. In some examples, the second transmission channel 106 may be a fiber-optic quantum channel or any other quantum channel including, without limitation, vacuum or air.

Each transmission channel, such as a fiber optic link between two adjacent nodes in an optical network, has associated with it various sources of error, such as polarization-mode dispersion (PMD) and polarization-dependent loss (PDL). Moreover, depending upon installation techniques, physical stresses, time of day, and many other factors, a fiber optic link may have one or more portions or sections where PMD error is a dominant error source, one or more portions or sections where PDL error is a dominant error source, and so on. For simplicity of discussion (and not to limit the applicability of the various embodiments), two basic scenarios are discussed in more detail; namely, a transmission channel (e.g., fiber optic link) with a portion proximate a transmitting node (first portion) having either PDL error or PMD error as a dominant error source, and a portion proximate a receiving node (second portion) and having either PMD error or PDL error as a dominant error source.

As depicted in FIG. 1, the apparatus or system 100 depicts within the first transmission channel 104 a decohering element 104-D providing a decohering function $\tau$ so as to address/emulate PMD, connected in series with a filtering element 104-F providing a filtering function $\gamma$ to address/emulate PDL. The order of the decohering 104-D and filtering 104-F elements in the first transmission channel 104 may be changed (e.g., during experimental verification) to accommodate either of a decoherence-first 104DF case and a filtering-first 104FF cases, as noted by the interchangeable indication therebetween of FIG. 1, and as will be discussed in more detail below.

As depicted in FIG. 1, the apparatus or system 100 utilizes within the second transmission channel 106 a compensating filtering element 106-CF providing a compensating filtering function $\gamma_C$ to compensate for errors in the first transmission channel 104, as will be discussed below. It is noted that the second transmission channel 106 may be configured as filtered 106F (i.e., including the compensating filtering element 106-CF) or not filtered 106NF (i.e., not including the compensating filtering element 106-CF).

The first control unit 150 may be configured to compare the data from the individual detector systems to provide thereby coincidence counts (N) for the channels, such as the number of simultaneous detections of certain polarizations (e.g., Nhh, Nhv, Nvh, Nvv).

Some embodiments herein include a method for compensating for entanglement loss in communication channels in a communication system comprising at least one entangled photon source 102 and at least a first transmission channel 104 and a second transmission channel 106. The first transmission channel 104 will usually exhibit an inherent loss referred to herein as a first entanglement loss. Such losses may be due to PDL. Another contributor to the disentanglement of photons may be PMD.

According to some embodiments, a tool may be implemented wherein the control unit(s) includes an analytical model system (AMS) 160 for characterizing the communications system based on the quantum coincidence measurements provided thereto via a quantum coincidence extractor 150, wherein the analytical modelling system computes a two-element model of the communications system that takes into account decoherence and mode filtering.

A toll according to various embodiments may be computer implemented and an appropriate hierarchical level within a communications network, storage network, and so on. The tool may perform some or all of the various functions described herein, and may be implemented at a local or node level (e.g., so as to perform local or node functions such as selecting a preferred node output transmission channel), or a network level (such as to select preferred paths through an optical mesh network, select nodes forming such paths, control higher level network management functions, and the like). In various embodiments, a tool such as a computer implemented tool is used to perform various functions such as described herein with respect to the various figures.

The control unit(s) 150/160 control the various aspects of the communications systems. Those skilled in the art will understand how the control unit functions. They may be implemented as hardware (one or more processors) or a combination of hardware and software. For example, the functions associated with the control unit(s) 150/160 as depicted and described herein, as well as other functions benefiting from digital signal processor (DSP) or computer implementation, may be implemented as hardware or a combination of software and hardware, such as by using a general purpose computer, one or more digital signal processors (DSPs), one or more application specific integrated circuits (ASICs), or any other hardware equivalents or combinations thereof. In various embodiments, computer instructions associated with a function of an element or portion thereof are loaded into a respective tangible and non-transitory memory and executed by a respective processor to implement the respective functions as discussed herein. Thus various functions, elements and/or modules described herein, or portions thereof, may be implemented as a computer program product wherein computer instructions, when processed by a computing device, adapt the operation of the computing device such that the methods or techniques described herein are invoked or otherwise provided. Instructions for invoking the inventive methods may be stored in tangible and non-transitory computer readable medium such as fixed or removable media or memory or stored within a memory within a computing device operating according to the instructions.

As will be discussed in more detail below, various embodiments contemplate an analytical modelling system for characterizing an apparatus/system such as provided herein with respect to FIG. 1. The analytical modelling system computes four elements of a quantum state density matrix from the coincidence counts, as follows (it is noted that the diagonal matrix elements are significant and are labelled as pu, p22, p33, and p44):

$$pu = Nhhi(Nhh+Nhv+Nvh+Nvv);$$

$$p22 = Nhvl(Nhh+Nhv+Nvh+Nvv);$$

$$p33 = Nvhi(Nhh+Nhv+Nvh+Nvv); \text{ and}$$

$$p44 = Nvv/(Nhh+Nhv+Nvh+Nvv).$$

The analytical modelling system quantifies decoherence by determining the values of R (decoherence) from the relevant equations, and quantifies filtering magnitude by determining the values of gamma (y).

Additionally, the analytical model determines an appropriate order of the decoherence and the mode filtering in the given channel by comparing the magnitude of p22 and p33, whereas a larger p22 value indicates decoherence followed by filtering, while a larger p33 value indicates filtering followed by decoherence.

If the analytical modelling system determines a filtering-first situation, then the quantum signals are improved by inserting an appropriate filtering in the undisturbed channel (e.g., Channel B or 106).

For instance, U.S. Pat. No. 10,693,565 to B. T. Kirby, D. E. Jones, M. Brodsky, titled "Compensating for entanglement loss in communication lines," which issued Jun. 23, 2020, discusses how to choose an appropriate compensating filter. It is incorporated by reference in its entirety. Those techniques can be used for inserting appropriate filtering in the undisturbed channel. Briefly, a polarization-dependent loss (PDL) element or filter may be inserted into a certain channel of the network in order to compensate for the effects of PDL inherent to several channels of the transport layer of the network. In this manner, an actual PDL element acting on one photonic qubit of an entangled state is also considered as a virtual element acting on the other photonic qubit of the entangled pair of photonic qubits.

If the analytical modelling system determines a decoherence-first situation, then no action is taken. Inserting filtering in the undisturbed channel could improve quantum signals only marginally (See, e.g., D. E. Jones, B. T. Kirby, G. Riccardi, C. Antonelli, M. Brodsky, "Exploring classical correlation in noise to recover quantum information using local filtering," New Journal of Physics, 22, 073037, July 2020, herein incorporated by reference in its entirety).

The essence of the novel tool is the in-situ characterization of quantum channels in quantum networks. The advantage of the method is in fact that a very detailed characterization of a time-varying quantum communication channel can be extracted from specific quantum correlation measurements (conventionally conducted by the network operator as part of nearly any quantum protocols), rather than by employing any additional channel characterization equipment and measurement protocols. The novelty of the method relies on a specific relationship between measured quantum correlations and inherent properties of the quantum communication channel.

Referring to FIG. 1, which also illustrates a communications system or experimental apparatus, the following elements and considerations are provided:

τ: decohering element.
γ: filtering element.
$γ_C$: compensating filtering element.
EPS: entangled photon source.
DSF: dispersion-shifted fiber.
PDL: PDL emulator.
PMD: PMD emulator which applies a differential group delay τ=6.6 ps. PC: polarization controller.
DS: detector station.
PA: polarization analyzer, e.g., comprising several waveplates and a single polarizer.
SPD: single photon detector.

The order of the decohering and filtering elements in channel A can be changed to accommodate the decoherence-first 104DF and filtering-first 104FF cases.

Consider two different settings for both the filtering-first and decoherence-first configurations; one in which τ and γ are aligned, and another in which they are orthogonal to each other in Stokes space (or equivalently they form an angle of 45 degrees in Jones space). The experimental setup consists of an entangled-photon source (EPS), telecom optical fibers, and two separate detector stations that include polarization analyzers (PA) and InGaAs single photon detectors, which are used to perform state tomography. In order to introduce controllable decoherence and modal filtering in the channel, use polarization-mode dispersion (PMD) and polarization-dependent loss (PDL) emulators, respectively. The PDL emulators, which are fully configurable both in magnitude (within the 0 dB-7 dB range) and orientation, can be inserted in the paths of the two photons. All of the PDL emulators are PMD-free, except for one that has a fixed differential group delay (DGD); use the latter to reproduce the effect of lumped decoherence.

The entangled photons are generated inside the EPS by pumping a dispersion-shifted fiber (DSF) with a 50 MHz pulsed fiber laser that operates at 193.1 THz and creates signal and idler photons via four-wave mixing. The average number of generated photon pairs per pulse (PPP) can be tuned in, approximately, the 0.001 to 0.1 PPP range. The generated photons are spectrally separated and routed to channels on the 100 GHz-spaced ITU grid. For this specific experiment, use channels 28 (192.8 THz) and 34 (193.4 THz). The resulting photon temporal wavefunctions are of a sinc-like shape with temporal FWHM of about 15 ps. A relevant value of the fixed DGD of 6.6 ps was chosen to introduce a non-negligible entanglement reduction, corresponding to a concurrence of C=0.66 in the absence of PDL. It is noted that for these temporal waveforms, generally speaking, a drop of concurrence from 1 to 0 can be seen by increasing the DGD from 0 to 14 ps.

A schematic of the experimental setup is shown in FIG. 1. The order of decoherence and modal filtering, as well as the relative orientation of $\tau$ and $\gamma$, can be varied to cover all of the possible configurations by adjusting the PMD and PDL emulators.

Modelling the Effect of Cascaded Decoherence and Filtering on Polarization-Entangled Photons A model for, illustratively, the joint effect of lumped decoherence and mode-filtering elements in the optical path of one of two polarization-entangled photons on the quantum properties of the received two-photon state is presented below.

While photons can be entangled in various physical dimensions (frequency, angular momentum, time-bin, etc.), these embodiments focus on polarization as the most ubiquitous degree of freedom. Consider a pair of polarization-entangled photons, where one photon, referred to as photon A, propagates through a fiber channel, and the second photon, referred to as photon B, stays in the proximity of the source and experiences no propagation effects. The most general channel resulting from the concatenation of two elements is studied herein; namely, a decoherence element and a mode-filtering one.

One goal is to characterize the dependence of the propagated state's quantum properties on the details of the channel implementation, that is the order in which decoherence and modal filtering act on the transmitted photon and their relative orientation. The order of the two elements is representative of how the two effects occur along the photon propagation path, as well as of the bidirectionality of a channel. The relative orientation of the elements captures the changes of the eigenstates of each of the two polarization effects. These are ever-present in fiber routes due to changing ambient conditions.

Start by expressing the state of the polarization-entangled photon pair in the frequency domain, which facilitates a comparison with the experimental setup used in this work. Consistent with the setup, assume a pulsed-pump source based on a $\chi^{(3)}$ medium, for which the generated two-photon state is:

$$|\psi_{in}\rangle = |\tilde{f}(\omega_A, \omega_B)\rangle \otimes \frac{|h_A h_B\rangle + |h_{A'} h_{B'}\rangle}{\sqrt{2}} \qquad (1)$$

where ($h_A$, $h_{A'}$) and ($h_B$, $h_{B'}$) denote two bases of orthogonal polarization states for photons A and B, respectively, and where $$|\tilde{f}(\omega_A, \omega_B)\rangle = \iint d\omega_A d\omega_B \tilde{f}(\omega_A, \omega_B) \omega_A, \omega_B, \qquad (2)$$

with $$\tilde{f}(\omega_A, \omega_B) = H_A(\omega_A) H_B(\omega_B) \times \int d\omega' \tilde{E}_p(\omega') \tilde{E}_p(\omega_A + \omega_B - \omega'). \qquad (3)$$

Here, $\tilde{E}_p(\omega)$ denotes the Fourier transform of the pump waveform $E_p(t)$, and $H_A(\omega_A)$ and $H_B(\omega_B)$ denote the transfer functions of the filters applied to the two photons prior to transmission. The time-domain equivalent of Eq. (1) is:

$$|\psi_{in}\rangle = |f(t_A, t_B)\rangle \otimes \frac{|h_A h_B\rangle + |h_{A'} h_{B'}\rangle}{\sqrt{2}}, \qquad (4)$$

where $$|f(t_A, t_B)\rangle = \iint dt_A dt_B f(t_A, t_B) |t_A, t_B\rangle, \qquad (5)$$

with $f(t_A, t_B)$ being the inverse Fourier transform of $\tilde{f}(\omega_A, \omega_B)$.

Denote by $\gamma$ the Stokes vector associated with the mode-filtering element, whose effect is described by the operator $T_0 = \exp(\gamma \cdot \sigma/2)$, where $\sigma$ is a vector whose elements are the three Pauli matrices, so that $\gamma \cdot \sigma = \gamma_1 \sigma_1 + \gamma_2 \sigma_2 + \gamma_3 \sigma_3$. With no loss of generality, assume that the z axis in Stokes space corresponds to the polarization state $h_A$ and that $\gamma$ is aligned with it, in which case the mode-filtering operator simplifies to the following diagonal form:

$$T_0 = \begin{pmatrix} e^{\gamma/2} & 0 \\ 0 & e^{-\gamma/2} \end{pmatrix} \qquad (6)$$

in the ($h_A$, $h_{A'}$) basis, where $\gamma = |\gamma|$. On the other hand, the effect of the birefringent decohering element characterized by the Stokes vector z is described by the operator $U(\omega) = \exp(-i\omega\tau \cdot \sigma/2)$, where $p_A$ and $p_{A'}$ denote its orthogonal eigenstates, and $\omega$ is the offset from the carrier frequency. The polarization basis ($p_A$, $p_{A'}$) can be used to re-express the input state as $$|\psi_{in}\rangle = |f(t_A, t_B)\rangle \otimes \frac{|p_A p_B\rangle + |p_{A'} p_{B'}\rangle}{\sqrt{2}}, \qquad (7)$$

where by ($p_B$, $p_{B'}$) denotes an auxiliary orthogonal basis for the polarization of photon B given by $p_B = p_A|h_A h_B + p_{A'}|h_{A'} h_{B'}$ and $p_{B'} = p_{A'}|h_A h_B + p_A|h_{A'} h_{B'}$. In the basis ($p_A$, $p_{A'}$), the effect of decoherence simplifies to a relative delay $\tau = |\tau|$ between the polarization states $p_A$ and $p_{A'}$.

The first channel configuration considered is the one in which the modal filtering element precedes the decohering element (what follows is referred to as filtering-first configuration). In this case, the output state is obtained by first applying the filtering operator to Eq. (1) and then expressing the resulting state in the $(p_A, p_{A'})$ basis prior to applying the decohering operator. This results in the output state:

$$|\psi_{out}\rangle = \frac{\eta}{\sqrt{2}} |f(t_A - \tau/2, t_B)\rangle \otimes (e^{\frac{\chi}{2}} \langle p_A | h_A \rangle | p_A h_B \rangle + \qquad (8)$$

$$e^{-\frac{\chi}{2}} \langle p_A | h_{A'} \rangle | p_A h_{B'} \rangle) +$$

$$\frac{\eta}{\sqrt{2}} |f(t_A + \tau/2, t_B)\rangle \otimes$$

$$(e^{\frac{\chi}{2}} \langle p_{A'} | h_A \rangle | p_{A'} h_B \rangle + e^{-\frac{\chi}{2}} \langle p_{A'} | h_{A'} \rangle | p_{A'} h_{B'} \rangle),$$

where the normalization coefficient $\eta$ accounts for the fact that the state is post-selected by coincidence measurement.

In the second channel configuration considered, decoherence precedes mode-filtering (what follows is referred to as a decoherence-first configuration). In this case, the output state is obtained by first applying the decohering operator to Eq. (7) and then expressing the resulting state in the $(h_A, h_{A'})$ basis prior to applying the filtering operator. This results in the state:

$$|\psi_{out}\rangle = \frac{\eta}{\sqrt{2}} |f(t_A - \tau/2, t_B)\rangle \otimes \qquad (9)$$

$$(e^{\frac{\chi}{2}} \langle h_A | p_A \rangle | h_A p_B \rangle + e^{-\frac{\chi}{2}} \langle h_{A'} | p_A \rangle | h_{A'} p_B \rangle) +$$

$$\frac{\eta}{\sqrt{2}} |f(t_A + \tau/2, t_B)\rangle \otimes$$

$$(e^{\frac{\chi}{2}} \langle h_A | p_{A'} \rangle | h_A p_{B'} \rangle + e^{-\frac{\chi}{2}} \langle h_{A'} | p_{A'} \rangle | h_{A'} p_{B'} \rangle).$$

The density matrix $\rho$ characterizing the polarization properties of the received state is then obtained in both cases by tracing the full density matrix $|\psi_{out}\rangle\langle\psi_{out}|$ over the time modes. To this end, it is convenient to introduce the function $R(\tau)$, defined as $$R(\tau) = \iint d\omega_A d\omega_B |\tilde{f}(\omega_A, \omega_B)|^2 e^{i\omega_A \tau}. \qquad (10)$$

When expressed in the time domain, this function describes the overlap integral between the original waveform and its delayed replica. Note that once the time modes have been traced out, all the system parameters that affect the time/frequency-dependent part of the received two-photon state (primarily the pump and filter characteristics and the magnitude of the decohering element) only enter the resulting density matrix through this function. Specifically, assuming that f is normalized so that $R(0)=1$, the elements of the resulting density matrix for the filtering-first case are $$\rho_{11} = e^{\gamma} \langle p_A | h_A \rangle |^2 \eta^2/2, \quad \rho_{22} = e^{-\gamma} \langle p_A | h_{A'} \rangle |^2 \eta^2/2$$

$$\rho_{33} = e^{\gamma} \langle p_{A'} | h_A \rangle |^2 \eta^2/2, \quad \rho_{44} = e^{-\gamma} \langle p_{A'} | h_{A'} \rangle |^2 \eta^2/2$$

$$\rho_{12} = \langle p_A | h_A \rangle \langle p_A | h_{A'} \rangle^* \eta^2/2$$

$$\rho_{13} = e^{\gamma} R^*(\tau) \langle p_A | h_A \rangle \langle p_{A'} | h_A \rangle^* \eta^2/2$$

$$\rho_{14} = R^*(\tau) \langle p_A | h_A \rangle \langle p_{A'} | h_{A'} \rangle^* \eta^2/2$$

$$\rho_{23} = R^*(\tau) \langle p_A | h_{A'} \rangle \langle p_{A'} | h_A \rangle^* \eta^2/2$$

$$\rho_{24} = e^{-\gamma} R^*(\tau) \langle p_A | h_{A'} \rangle \langle p_{A'} | h_{A'} \rangle^* \eta^2/2$$

$$\rho_{34} = \langle p_{A'} | h_A \rangle \langle p_{A'} | h_{A'} \rangle^* \eta^2/2. \qquad (11)$$

Similarly, for the decoherence-first case, they are $$\rho_{11} = e^{\gamma} |\langle h_A | p_A \rangle|^2 \eta^2/2, \quad \rho_{22} = e^{-\gamma} |\langle h_A | p_{A'} \rangle|^2 \eta^2/2$$

$$\rho_{33} = e^{\gamma} |\langle h_{A'} | p_A \rangle|^2 \eta^2/2, \quad \rho_{44} = e^{-\gamma} |\langle h_{A'} | p_{A'} \rangle|^2 \eta^2/2$$

$$\rho_{12} = e^{\gamma} R^*(\tau) \langle h_A | p_A \rangle \langle h_A | p_{A'} \rangle^* \eta^2/2$$

$$\rho_{13} = \langle h_A | p_A \rangle \langle h_{A'} | p_A \rangle^* \eta^2/2$$

$$\rho_{14} = R^*(\tau) \langle h_A | p_A \rangle \langle h_{A'} | p_{A'} \rangle^* \eta^2/2$$

$$\rho_{23} = R(\tau) \langle h_A | p_{A'} \rangle \langle h_{A'} | p_A \rangle^* \eta^2/2$$

$$\rho_{24} = \langle h_A | p_{A'} \rangle \langle h_{A'} | p_{A'} \rangle^* \eta^2/2$$

$$\rho_{34} = e^{-\gamma} R^*(\tau) \langle h_{A'} | p_A \rangle \langle h_{A'} | p_{A'} \rangle^* \eta^2/2. \qquad (12)$$

Note that in the first case, the density matrix is represented in the basis $p_A h_B$, $p_A h_{B'}$, $p_{A'} h_B$, $p_{A'} h_{B'}$, while in the second case it is expressed in the basis $h_A p_B$, $h_A p_{B'}$, $h_{A'} p_B$, $h_{A'} p_{B'}$. Imposing $\text{Tr}(\rho)=1$ yields in both cases $\eta^2 = 1/\cos h(\gamma)$. As is evident from Eqs. (11) and (12), the final state exhibits strong dependence on the order of the two elements and orientation of the corresponding eigenstates.

To quantify the degree of entanglement of the received state, use concurrence as a figure of merit. This can be extracted from the corresponding density matrices in the filtering-first and decoherence-first configurations, and the result, which follows after some cumbersome algebra, is in both cases $$C = \frac{|R(\tau)|}{\cosh(\gamma)}. \qquad (13)$$

Remarkably, unlike the shape of the state itself, the residual concurrence is not affected by any channel detail such as the relative orientation of the eigenstates of the two operators, or the order in which the two elements are concatenated. Instead it only depends on the channel's amount of filtering and magnitude of the birefringence vector. A general result encompasses several previous findings. When decoherence acts alone ($\gamma=0$), concurrence reduces to $C=|R(\tau)|$, which is the expression demonstrated in. On the other hand, when decoherence is absent ($\tau=0$), concurrence is given by $C=1/\cos h(\gamma)$, as found in. Finally, the result is consistent with the expression for concurrence found in, where the effect of mode-filtering on a Bell-diagonal state was studied. What follows provides a physical interpretation for the independence of concurrence on the order and relative orientation of the decoherence and filtering elements.

Filtering preceding decoherence. The way in which modal filtering in the A-optical path affects entanglement is through the probabilities of detecting specific two-photon polarization states (in the post-selected ensemble). If, prior to detection, the analyzer for photon A splits $h_A$ and $h_{A'}$, simultaneous clicks will be produced by the two states $|h_A h_B\rangle$ and $|h_{A'} h_{B'}\rangle$ only. However, if the analyzer splits a different pair of polarization states, say $p_A$ and $p_{A'}$, simultaneous clicks will be produced by the four states, $|p_A h_B\rangle$, $|p_{A'} h_B\rangle$, $|p_A h_{B'}\rangle$, and $|p_{A'} h_{B'}\rangle$, which emerge when expressing photon A in the basis $(p_A, p_{A'})$. If $p_A$ and $p_{A'}$ happen to be aligned with the vector $\tau$ defining a decoherence element concatenated to the mode-filtering element, then the temporal waveform associated with each of these four states does not suffer any distortion from decoherence (which simply introduces some delay in each of them); therefore, the corresponding probabilities of simultaneous clicks are not affected. This simple argument shows that the orientation of r does not interfere with the mechanism through which the preceding mode-filtering element affects the two-photon polarization entanglement.

Decoherence preceding filtering. The way in which decoherence in the A-optical path reduces entanglement is by correlating photon's A time of arrival with its polarization, so that in principle, one would be able to trace back the two photons' polarization based on their relative times of arrival. This ability is not affected by the presence of a mode-filtering element after decoherence in the path of photon A, as filtering does not distort the delayed replicas of the two-photon state waveform, but only the corresponding polarization contents, therefore leaving the arrival times of the two photons unchanged. This clarifies why the orientation of a decoherence element $\tau$ preceding a mode-filtering element has no impact on concurrence.

The two arguments illustrated above also imply that the order in which the decohering and mode-filtering elements are concatenated cannot affect the two-photon polarization entanglement. In fact, as all possible relative orientations yield the same concurrence, all cases are equivalent to the one in which the vectors $\tau$ and $\gamma$ are aligned, and in this special case, the two effects commute with each other. Note that while concurrence is insensitive to the details of the two-element channel, the density matrices of the propagated state are not. The consequences of this on the design of a quantum network, such as choosing a direction in which the channel is to be used, are discussed in more detail below.

The plots of FIGS. 2A-2H graphically depict theoretical (left) and experimental (right) information useful in understanding the embodiments, specifically theoretical (left) and experimental (right) representation of Eqs.(11)-(12), for the case where the eigenvectors of the filtering and decoherence elements are aligned ((a)-(e) and (c)-(g)) and orthogonal ((b)-(f) and (d)-(h)) in Stokes space. The matrices in the top two rows ((a)-(b)-(e)-(f)) refer to the filtering-first scenario and are expressed in the basis $p_A h_B$, $p_A h_{B'}$, $p_{A'} h_B$, $p_{A'} h_{B'}$. The matrices in the bottom two rows ((c)-(g)-(d)-(h)) refer to the decoherence-first scenario and are expressed in the basis $h_A p_B$, $h_A p_{B'}$, $h_{A'} p_B$, $h_{A'} p_{B'}$. $\gamma$=0.46 for all matrices.

First, experimentally confirm Eqs. (11, 12) in four specific cases. Next is introduced both a PDL and a PMD emulator in the channel of photon A and vary the emulators' order and orientation. That is, by using polarization controllers, the embodiments can either align vectors $\tau$ and $\gamma$ or make them orthogonal. The left column of the plots of FIGS. 2A-2H shows the matrices expressed by Eqs. (11, 12). The right column presents experimentally measured matrices in the same four scenarios. The two columns show striking similarities, thus verifying the theoretical calculations. Minor variations due to experimental noise are slightly noticeable in the zero-valued elements of the experimental matrices. The matrices in the top two rows, expressed in the basis $p_A h_B$, $p_A h_{B'}$, $p_{A'} h_B$, $p_{A'} h_{B'}$, correspond to the filtering-first scenario. Similarly, the bottom two rows of matrices refer to the decoherence-first configuration and are expressed in the basis $h_A p_B$, $h_A p_{B'}$, $h_{A'} p_B$, $h_{A'} p_{B'}$. The vectors $\tau$ and $\gamma$ are aligned for (a, c, e, g) and are orthogonal for (b, d, f, h). The four specific cases are color-coded in FIGS. 2A-2H, and the same color coding is adopted throughout the rest of the disclosure. The figure clearly shows that the orientation and ordering of the decohering and filtering elements affect the final quantum state as seen in the different density matrices.

Figure 3:
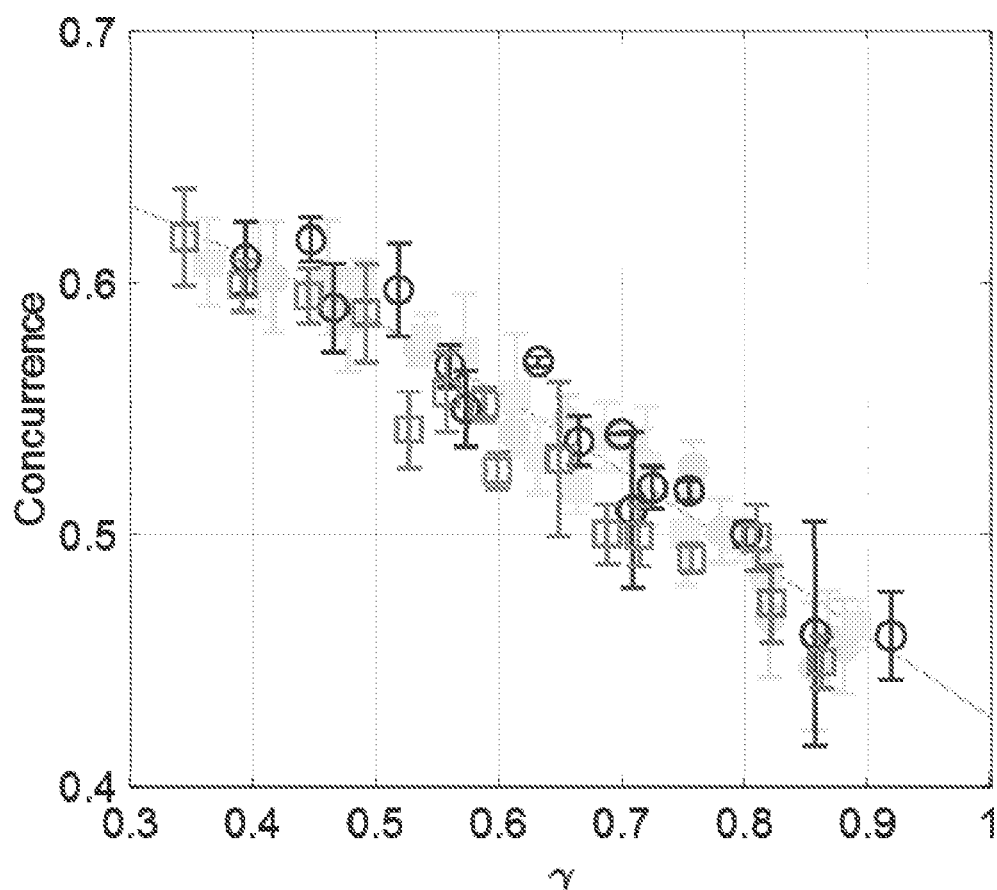
FIG. 3 graphically illustrates concurrence as a function of the amount of filtering γ in the channel.
Figure 4A:
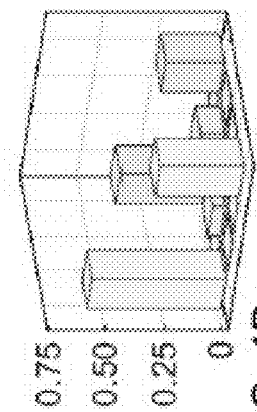
Figure 4B:
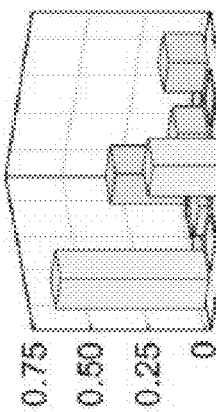
Figure 4C:
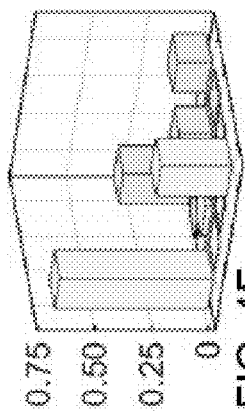
Figure 4D:
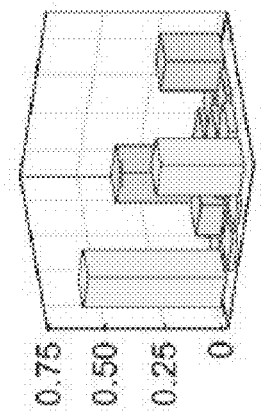
Figure 2E:
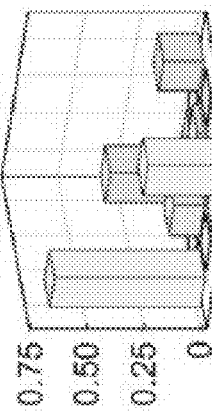
Figure 4F:
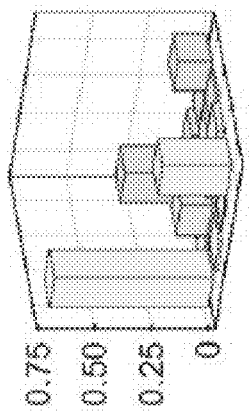
Figure 4G:
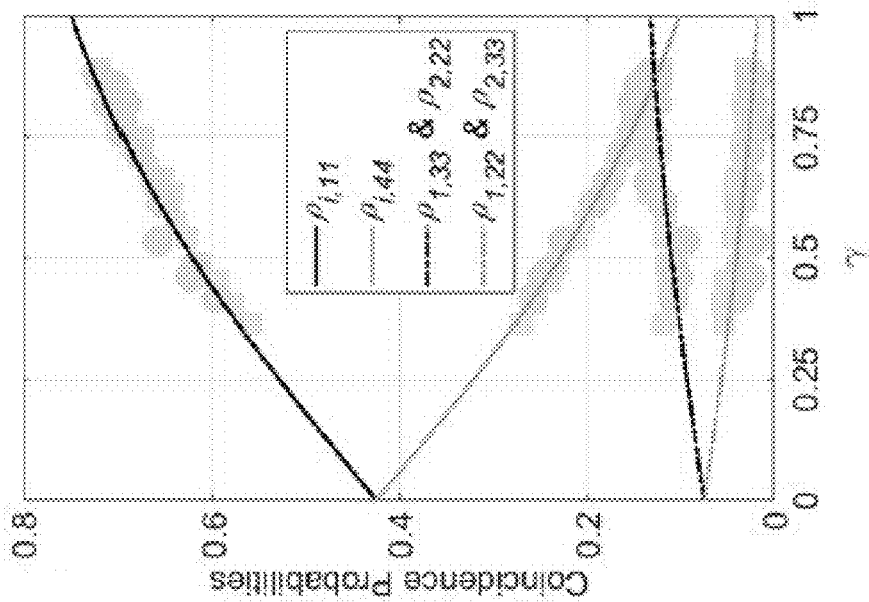

FIG. 3 graphically illustrates concurrence as a function of the amount of filtering $\gamma$ in the channel. Referring to FIG. 3, the dashed line represents the theoretical result of Eq. (13). All of the markers are experimental points: squares refer to the filtering-first scenario, while circles refer to the deco-herence-first scenario. In both cases, the empty markers correspond to the case in which the $\gamma$ is aligned with $\tau$, and the filled ones to the case in which they are orthogonal.

Next, validate the theoretical expression Eq. (13), that is plotted in FIG. 3 with a dashed line. The symbols show the experimental concurrence as a function of the amount of filtering $\gamma$ in the channel. The squares refer to the filtering-first configuration, and the circles refer to the decoherence-first scenario; empty and filled markers are used for the aligned and orthogonal configuration, respectively. All the data points are in excellent agreement with the theoretical curve. The plot confirms that the amount of entanglement is determined only by the magnitude of decoherence and the strength of the modal filtering and, contrary to the states themselves, is independent of either order or relative orientation.

FIGS. 4A-4G graphically depict experimental results useful in understanding the embodiments, specifically experimental results of the setup reproducing Eq. (14) for the decoherence-first (green of FIGS. 4A-4C) and filtering-first (cyan of FIGS. 4D-4F) cases when $\tau$ and $\gamma$ are orthogonal in Stokes space. Left panel: experimental density matrices expressed in the basis $h_A h_B$, $h_A h_{B'}$, $h_{A'} h_B$, $h_{A'} h_{B'}$, for $\gamma$=0.41 (a, d), 0.66 (b, e), and 0.77 (c, f). Right panel: coincidence probabilities, measured via the diagonal elements of the density matrix, as a function of $\gamma$. Comparison of $\rho_{i,11}$, $\rho_{i,22}$, $\rho_{i,33}$, and $\rho_{i,44}$, where i=1, 2 for the filtering-first and decoherence-first cases, respectively. $\rho_{i,11}$ and $\rho_{i,44}$ are independent of the ordering of the two effects; however, $\rho_{1,22}$ is equivalent to $\rho_{2,33}$, and vice-versa.

Turning attention to the ordering of the decohering and filtering elements, which is important in fiber channels for various reasons. A particularly illustrative case is the one with the decohering and filtering elements $\tau$ and $\gamma$ being orthogonal in Stokes space. Indeed in this case, if photon A is expressed in the basis ($h_A$, $h_{A'}$), and photon B in the basis ($h_B$, $h_{B'}$), the density matrix simplifies to:

$$\rho_i = \frac{1}{4\cosh(\gamma)} \begin{pmatrix} e^\gamma(1+R(\tau)) & 0 & 0 & 1+R(\tau) \\ 0 & e^{\xi_i \gamma}(1-R(\tau)) & 1-R(\tau) & 0 \\ 0 & 1-R^*(\tau) & e^{-\xi_i \gamma}(1-R(\tau)) & 0 \\ 1+R^*(\tau) & 0 & 0 & e^{-\gamma}(1+R(\tau)) \end{pmatrix} \quad (14)$$

where i=1 and i=2 correspond to the filtering-first and decoherence-first scenarios, respectively, and $\xi_1=-\xi_2=1$.

In this particularly illustrative situation, the two expressions can be obtained from each other by simply permutating the elements $\rho_{22}$ and $\rho_{33}$. An experimental verification of this formula is presented in the plots of FIGS. 4A-4F. The left panel shows experimental density matrices related to the two scenarios for $\gamma$=0.41, 0.66, 0.77; the right panel shows a plot of the experimentally obtained coincidence probabilities given by the diagonal elements of $\rho_i$ versus $\gamma$, with the four curves showing the corresponding theoretical expressions from Eq. (14). Consistent with the theory, in the plot of FIG. 4G, one can see that as modal filtering in the channel is increased, $\rho_{i,11}$ increases and $\rho_{i,44}$ decreases, both in the filtering-first case (cyan markers of FIGS. 4A-4F), and in the decoherence-first scenario (green markers of FIGS. 4-4F). On the other hand, in the filtering-first case, $\rho_{i,22}$ decreases with $\gamma$, and $\rho_{i,33}$ increases with it, whereas the opposite behaviour is observed in the decoherence-first scenario.

Analysis shows that this simple difference between the two cases provides a powerful tool to gain information about the channel in which the photon is propagating when vector $\tau$ and $\gamma$ are orthogonal in Stokes space. By simply measuring $\rho_{22}$ and $\rho_{33}$, that is by recording only coincidence counts along ($h_A$, $h_{B'}$) and ($h_{A'}$, $h_B$) instead of reconstructing the whole density matrix, one can in fact tell whether modal loss or decoherence comes first. Note that $\rho_{22}$ and $\rho_{33}$ are indicative of the quantum bit error ratio (QBER), and nearly all quantum protocols monitor QBER on a regular basis.

The knowledge of whether filtering is concentrated toward the beginning or the end of a long optical route is very important for Procrustean entanglement distillation, as illustrated with the two-element model of Eqs. (11, 12) below. It has been shown that a judicially selected pair of filters could distill entanglement from certain mixed states. More recently, the group investigated how a filter applied to photon B of an entangled pair could partially or fully restore entanglement diminished by inadvertent filtering inherent to channel A. The inventors previously found that when the filtering is concentrated towards the end of the route, a situation that corresponds to the decoherence-first case of the model, the entanglement could be restored fully or partially depending on the type of noise encountered by photon A.

For the opposite case of the filtering-first scenario in channel A, distillation with the help of an additional filter in channel B is rather straightforward, and demonstrated below for the sake of completeness. FIG. 5 plots concurrence as a function of increasing $\gamma$ for the filtering-first case. A fixed decoherence element follows the filter in channel A and is responsible for the decreased concurrence of C=0.66 for $\gamma$=0. Color-coded filled and empty symbols correspond to aligned and orthogonal $\tau$ and $\gamma$, respectively. The dashed curve is a plot of Eq. (13). The upper set of data points demonstrates entanglement restoration when an extra filter is added to channel B. The solid curve shows the restored concurrence value, also given by the same equation with $\gamma$=0, that is, the value that would be observed if only the decohering element were present in the optical path of photon A. The data points show that full compensation can be achieved for all filtering levels regardless of the relative orientation of $\tau$ and $\gamma$.

It is noted that the greater effectiveness of nonlocal compensation in the filtering-first configuration relative to the decoherence-first configuration demonstrated above has important implications in the design of optical networks for polarization-entanglement distribution. Indeed, the same channel could in general be used for photon distribution in two opposite directions, as could be the case for a specific graph edge of a quantum network, or when two parties take turns in exchanging messages using a point-to-point connection. Either way, the resulting channel will cause different impairments depending on the photon's propagation direction.

FIG. 5 graphically illustrates concurrence as a function of the filtering magnitude $\gamma$ in filtering-first scenario embodiments. Specifically, referring to FIG. 5, it can be seen by inspection that empty and filled markers correspond to the cases in which the vectors $\gamma$ and $\tau$ are aligned and orthogonal, respectively. The upper set of data points refer to the case in which nonlocal compensation of modal filtering is implemented by passing photon B through and additional filtering element. The dashed curve is the analytical result Eq. (13) and the solid curve shows the restored concurrence level, also given by the same equation with $\gamma$=0.

Equation 14 presented above is useful in characterizing the system. In this equation, the diagonal matrix elements are significant. They are labelled pu, p22, p33, p44. The analytical modelling system computes four elements of a quantum state density matrix from the coincidence counts, as follows:

$pu = Nhhh/(Nhh+Nhv+Nvh+Nvv);$ $p22 = Nhvl/(Nhh+Nhv+Nvh+Nvv);$ $p33 = Nvhi/(Nhh+Nhv+Nvh+Nvv);$ and $p44 = Nvvl/(Nhh+Nhv+Nvh+Nvv).$ The analytical modelling system quantifies decoherence by determining the values of R, (decoherence) from Equation 14. And it quantifies filtering magnitude by determining the values of gamma (y) from the Equation 14.

Additionally, the analytical model determines an order of the decoherence and the mode filtering in the given channel by comparing the magnitude of p22 and p33, whereas a larger p22 value indicates decoherence followed by filtering or a larger p33 value indicates filtering followed by decoherence.

If the analytical modelling system determines a filtering-first situation, then the quantum signals are improved by inserting an appropriate filtering in the undisturbed channel.

For instance, the aforementioned U.S. Pat. No. 10,693,565 discusses how to choose an appropriate compensating filter. Those techniques can be used for inserting appropriate filtering in the undisturbed channel. Briefly, a polarization-dependent loss (PDL) element or filter may be inserted into a certain channel of the network in order to compensate for the effects of PDL inherent to several channels of the transport layer of the network. In this manner, an actual PDL element acting on one photonic qubit of an entangled state is also considered as a virtual element acting on the other photonic qubit of the entangled pair of photonic qubits.

If the analytical modelling system determines a decoherence-first situation, then no action is taken. Inserting filtering in the undisturbed channel could improve quantum signals only marginally (See, e.g., the aforementioned D. E. Jones et al. (2020) paper).

A tool according to one embodiment advantageously provides in-situ characterization of quantum channels in quantum networks. The advantage of the method is in fact that a very detailed characterization of a time-varying quantum communication channel can be extracted from specific quantum correlation measurements (conventionally conducted by the network operator as part of nearly any quantum protocols), rather than by employing any additional channel characterization equipment and measurement protocols. The novelty of the method relies on a specific relationship between measured quantum correlations and inherent properties of the quantum communication channel.

Relation to a General Fiber-Optic Channel

The following discussion is directed to how a quantum channel formed by a filtering element and a decohering element is representative of a general fiber-optic channel operated in the linear propagation regime.

Specifically, by expanding the treatment of a bi-photon quantum state, one photon of which is distributed over an optical fiber, to include a more general channel model. In the above portions of this specification, the channel was represented by two lumped elements, the order and relative orientation of which has been carefully examined. Installed fibers and free space channels are naturally more complex because the optical path is long and perturbations that cause decoherence and mode filtering are local in nature, numerous, and occur throughout the length of the route. PMD serves as a major source of decoherence for polarization entanglement, while filtering arises from PDL. Since PMD and PDL originate from spatially distributed sources, their effect is not simply that of two lumped sources; instead, they add in a rather complex fashion. However, their joint effect on a sufficiently narrow-band signal can be described by the following frequency-dependent transfer matrix:

$$T(\omega) = \exp\left(-\frac{i}{2}\omega\tilde{\tau}\cdot\sigma\right)T_0, \quad (15)$$

where $T_0$ is the transfer matrix at $\omega=0$ and can be assumed to be in the diagonal form of Eq. (6) with no loss of generality. The symbol $\tilde{\tau}$ denotes a three-dimensional vector. By letting the components of $\tilde{\tau}$ be complex-valued, Eq. (15) describes the most general channel instantiation.

In this case, the imaginary component of $\tilde{\tau}$ is responsible for the presence of frequency-dependent PDL, which has non-trivial implications in terms of waveform distortion.

If photon A of the polarization-entangled state in Eq. (4) propagates in a fiber link described by Eq. (15), and photon B does not suffer any propagation effects, the received two-photon state can be expressed as $$|\psi_{out}\rangle = \eta \int\int d\omega_A d\omega_B \tilde{f}(\omega_A,\omega_B)|\omega_A,\omega_B\rangle \otimes \frac{|T(\omega_A)h_A,h_B\rangle + |T(\omega_A)h_{A'},h_{B'}\rangle}{\sqrt{2}}, \quad (16)$$

where the coefficient $\eta$ ensures that the output state is correctly normalized after post-selection. The density matrix $\rho$ characterizing the polarization properties of the received state is then obtained by tracing the full density matrix $|\psi_{out}\rangle\langle\psi_{out}|$ over the frequency modes:

$$\rho_{ij} = \frac{\eta^2}{2}\int\int d\omega_A d\omega_B |f(\omega_A,\omega_B)|^2 T_{n_i,m_i}(\omega_A)T^*_{n_j,m_j}(\omega_A), \quad (17)$$

where $T_{n_i,m_j}$ denotes the element $(n_i,m_j)$ of T, with $n_1=n_2=1$, $n_3=n_4=2$, $m_1=m_3=1$, and $m_2=m_4=2$, whose computation is more convenient using the following expansion:

$$\exp\left(\frac{i}{2}\omega\tilde{\tau}\cdot\sigma\right) = \cos\left(\frac{\omega\tilde{\tau}}{2}\right)I - i\frac{\tilde{\tau}\cdot\sigma}{\tilde{\tau}}\sin\left(\frac{\omega\tilde{\tau}}{2}\right), \quad (18)$$

where $\tilde{\tau}$ is either one of the square roots of $\tilde{\tau}\cdot\tilde{\tau}$.

Since the simple analytical two-element model of Eqs. (11, 12) must be a particular case of the general channel description of Eq. (17), begin by finding the constraints that reduce the latter to the former. Clearly, a real-valued vector $\tilde{\tau}$, such that $\tilde{\tau}=\tau$, reduces the general channel to the filtering-first configuration. On the other hand, the constraints for the decoherence-first configuration are a bit more involved. This configuration is characterized by the transfer matrix $$T(\omega) = T_0\exp\left(-\frac{i}{2}\omega\tau\cdot\sigma\right) = \exp\left(-\frac{i}{2}\omega\tilde{\tau}\cdot\sigma\right)T_0, \quad (19)$$

where the second equality implies the identity $\tilde{\tau}\cdot\sigma = T_0\tau\cdot\sigma T_0^{-1}$, which yields:

$$\tilde{\tau}_1 = \tau_1 \quad (20)$$

$$\tilde{\tau}_2 = \cos h(\gamma)\tau_2 - i\sin h(\gamma)\tau_3 \quad (21)$$

$$\tilde{\tau}_3 = \cos h(\gamma)\tau_3 + i\sin h(\gamma)\tau_2. \quad (22)$$

Inspection of Eqs. (20-22) shows that the real and imaginary components of the complex vector $\tilde{\tau}$, which is denoted by $\tilde{\tau}_R$ and $\tilde{\tau}_I$, respectively, are orthogonal to each other. This constitutes the most relevant feature of the manifold of complex vectors $\tilde{\tau}$ spanned by the decoherence-first configuration.

Another, less restrictive, implication of Eqs. (20-22) is that the square length of the real component of $\tilde{\tau}$ exceeds that of its imaginary component by the square length of $\tau$, namely by the square differential group delay of the corresponding PDL-free link ($|\tilde{\tau}_R|^2 - |\tilde{\tau}_I|^2 = \tau^2$). Both of these relations emerge on average in all fiber-optic links, including space-division multiplexed transmission links based on multi-core and multi-mode fibers, where the complex vector $\tilde{\tau}$ is a random quantity. In particular, denoting by $\mathbb{E}$ ensemble averaging, the analogue of the first relation is $\mathbb{E}[\tilde{\tau}_R\cdot\tilde{\tau}_I]=0$, while the analogue of the second is $\mathbb{E}[|\tilde{\tau}_R|^2] - \mathbb{E}[|\tilde{\tau}_I|^2] = \mathbb{E}[\tilde{\tau}^2]$, where $\mathbb{E}[\tilde{\tau}^2]$ is intended to be the mean-square DGD that would accumulate in the link if PDL were absent. The latter relation does not ensure that the inequality $|\tilde{\tau}_R| \geq |\tilde{\tau}_I|$ is always fulfilled, but it does imply that its violation occurs with low probability. This primarily occurs for unrealistically large PDL values, which makes it of little relevance. Finally, it is worth noting that even if $|\tilde{\tau}_R| \geq |\tilde{\tau}_I|$, Eqs. (20-22) do not ensure that any arbitrary value of $|\tilde{\tau}_R|$ and $|\tilde{\tau}_I|$ can be matched. Indeed, for a given instance of $|\tilde{\tau}_R|$ and $|\tilde{\tau}_I|$, the values of $\tau_1$, $\tau_2$, and $\tau_3$ must satisfy the relation $$\frac{\tau_2^2 + \tau_3^2}{\tau_1^2 + \tau_2^2 + \tau_3^2} = \frac{1}{(|\tilde{\tau}_R|^2/|\tilde{\tau}_I|^2 - 1)\sinh^2(\gamma)} \leq 1, \quad (23)$$

where $\tau_1^2 + \tau_2^2 = \tau_3^2 = \tau^2 = |\tilde{\tau}_R| - |\tilde{\tau}_I|^2$, and where $\gamma$ is dictated by $T_0$.

Clearly, specific combinations of values of $|\tilde{\tau}_R|$, $|\tilde{\tau}_I|$, and $\gamma$ can violate the inequality in Eq. (23).

As an aside, this limitation disappears in a lumped element channel with an additional PDL element, so that the three-element channel is $T_1\exp(i\omega\tau\cdot\sigma/2)T_2=\exp(i\omega\tilde{\tau}\cdot\sigma/2)T_1T_2$, with $T_1T_2=T_0$. Here, the coefficient $\gamma_1$ of $T_1$ provides an additional degree of freedom in Eq. (23), which decouples the problem of matching $|\tilde{\tau}_R|$ and $|\tilde{\tau}_I|$ from that of matching $T_0$.

FIGS. 6A-6B graphically illustrate concurrence as a function of the angle formed by the real and imaginary parts of the complex-valued vector $\tilde{\tau}=\tilde{\tau}_R+i\tilde{\tau}_I$. The larger black dots refer to the decoherence-first configuration, where the vector $\tilde{\tau}$ is given by Eqs. (20-22), while the smaller dots were obtained by randomly varying the orientation of the real and imaginary parts of the same vector.

The following discussion compares the simple two-element channel model proposed above to a general polarization channel. While the latter precisely reproduces the real channel, the former captures its main characteristics over a pertinent range of the channel parameters with sufficient accuracy. An investigation of the effect of the relative orientation of $\tilde{t}_R$ and $\tilde{t}_I$ on the degree of entanglement of the received two-photon state will now be provided. For a meaningful comparison, start from the decoherence-first configuration of Eq. (19), with some fixed value of $\gamma$ and $\tau$ (as discussed above, the orientation of the decoherence vector $\tau$ is immaterial in this context). Then evaluate the corresponding complex vector $\tilde{\tau}$ according to Eqs. (20-22) and randomly vary the orientation of its real and imaginary components while keeping their lengths fixed. For each instance of $\tilde{\tau}$, evaluate the reduced density matrix $\rho$ of the propagated two-photon state and extract the corresponding concurrence C.

The results are shown in FIGS. 6A and 6B, where concurrence is plotted as a function of the angle formed by the real and imaginary components of $\tilde{\tau}$. The data points in the left panel were obtained for the displayed values of the DGD $\tilde{\tau}$ and for $\gamma=0.23$, which corresponds to a PDL value in decibel of $PDL_{dB}=2$ db. It is noted that the quantity $PDL_{dB}$ is defined as the power ratio, in decibel, between the least and most attenuated polarization states, which yields $PDL_{dB}=20 \log_{10}(e)\gamma$.

The data points in the right panel were obtained for values of $\gamma$ corresponding to the displayed values of $PDL_{dB}$ and for a DGD of 3 ps. In this example, assume a super-Gaussian profile of third order for both the pump power spectrum $|\tilde{E}_p(\omega)|^2$ and the filters' transmittivities $|H_{A,B}(\omega)|^2$ (Eq. (3)). For the former, use a 3-dB bandwidth of 50 GHz, while for the latter, use a 3-dB bandwidth of 100 GHz. The figure shows that varying the orientation of $\tilde{\tau}_R$ and $\tilde{\tau}_I$ produces some scattering of the measured concurrence below the decoherence-first configuration value, which is shown with the bigger dot. Extensive simulations show that this scattering is mostly affected by the magnitude of PDL, but it remains almost negligible for PDL and DGD values of practical relevance. Therefore, the decoherence-first case serves as a reliable tool for assessing entanglement degradation over a general channel.

Finally, the symmetry between the decoherence-first and filtering-first scenarios is noted. Indeed, Eq. (15) could be easily rearranged in the following form:

$$T(\omega) = \exp\left(-\frac{i}{2}\omega\tilde{\tau}\cdot\sigma\right)T_0 = T_0\exp\left(-\frac{i}{2}\omega\tilde{\tau}'\cdot\sigma\right), \quad (24)$$

where the complex-valued vector $\tilde{\tau}'$ is defined through the relation $\tilde{\tau}'\cdot\sigma = T_0^{-1}\tilde{\tau}'\cdot\sigma T_0$. For the general channel, the constraints on the complex-valued vector t will reverse between the filtering-first and decoherence-first configurations.

Correspondingly, the modelling results then reflect the filtering-first scenario. Hence, the two configurations are equally capable of emulating a general fiber-optic channel.

To gain insights into fiber-optic quantum channels, the inventors studied a quantum channel with decoherence and mode filtering acting on one photon of a travelling EPR pair. First, they devised an analytical channel model for the case of two lumped elements, one causing decoherence and another causing partial mode filtering, and derived analytical expressions for the density matrices of the propagated bi-photon states, as well as for their concurrence. The model permits us to examine the effect of the relative Bloch sphere orientation and the order in which a photon encounters the two elements, a reality in fiber-optic channels, where changes in ambient conditions dynamically reorient various polarization elements along the light-path. The inventors verified these findings in four specific experimental scenarios and proposed a method of channel characterization via QBER measurements. Interestingly, while the output quantum states depend on these channel characteristics, the amount of entanglement quantified by concurrence does not.

The inventors further checked the ability of the two-element model to describe the most general fiber-optic channel, where the effect of a multitude of small arbitrarily oriented decoherence and mode-filtering elements accumulates along the optical path. This corresponds to the most relevant case of polarization entanglement distribution in fiber-optic networks. By numerically investigating the effect of such a general channel, the inventors established a wide parameter range where the analytical two-element model serves as an accurate approximation of the general channel. These results offer an elegant tool to develop an intuition into fiber quantum channels and, hence, pave the way for future quantum telecommunication.

FIG. 7 depicts a flow diagram of an optical channel characterization method according to various embodiments, such as discussed above. Specifically, the method 700 of characterizing an optical channel may be used at optical nodes in an optical network or at any optical transmission source such as described herein.

Step 710 comprises generating, using an entangled photon source (EPS), pairs of entangled photons.

Step 720 comprises coupling first entangled photons A of the generated pairs AB of entangled photons to a first optical channel and second entangled photons B of the generated pairs AB of entangled photons to a second optical channel, wherein the first channel comprises an optical transmission channel to be characterized and the second optical channel comprises a local or storage optical channel configured to store an entangled photon for at least a sufficient amount of time to perform a desired function.

Step 730 comprises detecting, at each of the first and second channels, respective entangled photons, wherein each entangled photon A is expressed in the basis $(h_A, h_{A'})$ and each corresponding entangled photon B is expressed in the basis $(h_B, h_{B'})$.

Step 740 comprises determining quantum coincidence data (QCD) of detected entangled photons A and B.

Step 750 comprises measuring quantum-correlation along $(h_A, h_{B'})$ and $(h_{A'}, h_B)$ of the detected entangled photons using the determined QCD.

At step 760, responsive to $(h_A, h_{B'})$ being greater than $(h_{A'}, h_B)$, characterizing the first channel as a modal loss first channel;

At step 770, responsive to $(h_A, h_{B'})$ being less than $(h_{A'}, h_B)$, characterizing the first channel as a decoherence first channel.

At optional step 780, responsive to the first channel comprising a modal loss first channel, configuring the second channel to include a filtering element configured to compensate for modal loss.

At optional step 790, such as in the case of the method being used at an optical node to select an optical transmission channel, the preceding steps may be repeated for each of a plurality of available output or transmission channels so at to enable preferential selection as a transmission channel for the node of a transmission channel characterized as a modal loss first channel (or a transmission channel having associated with it a lowest amount of decoherence in the case there being no available modal loss first channels at the node).

Figure 8:
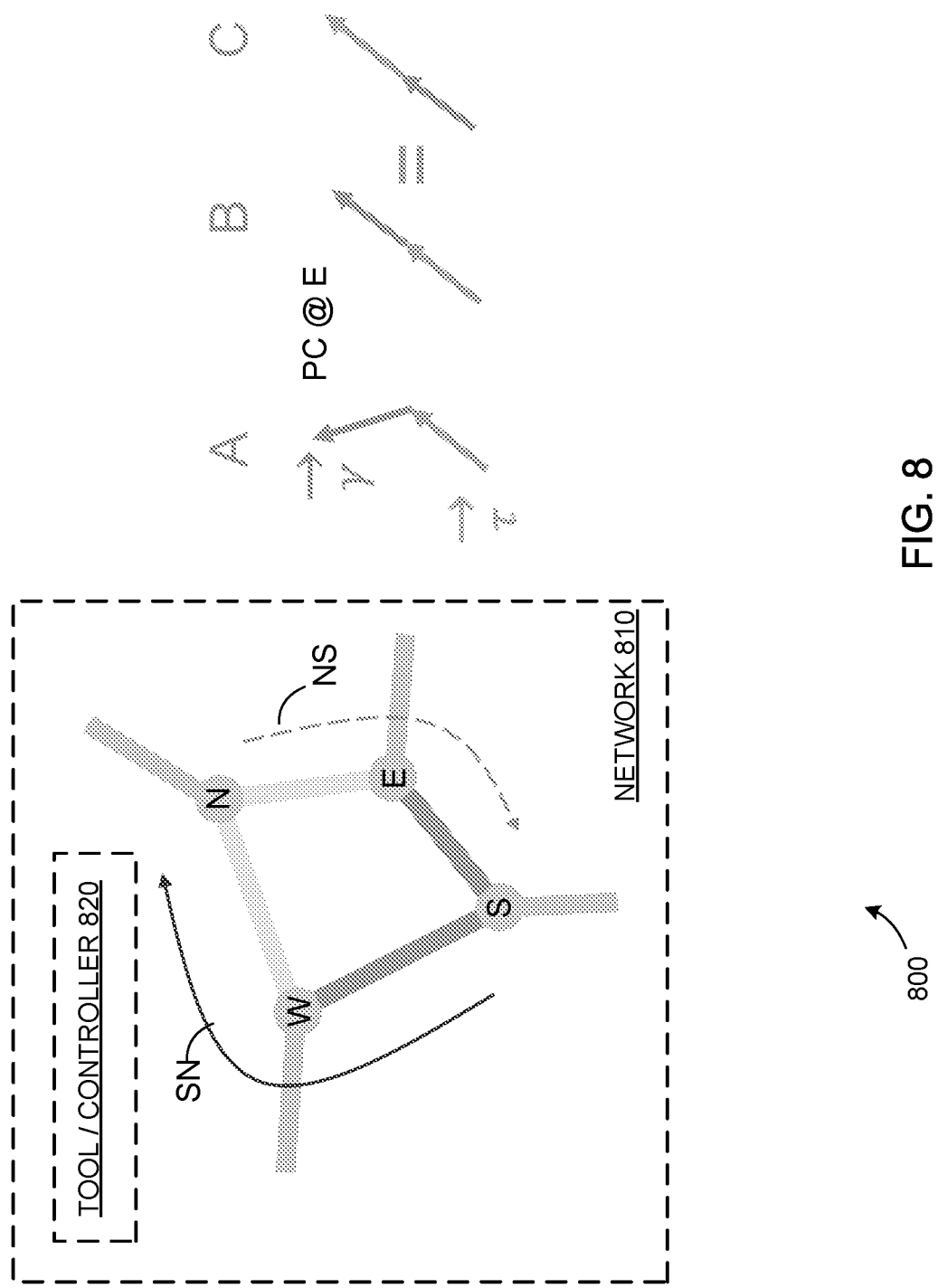
FIG. 8 graphically illustrates an application consideration of various embodiments.

FIG. 8 graphically illustrates an application consideration of various embodiments. In particular, for any optical transmission channel it is desirable to preferentially select the transmission channel comprising a modal loss first channel rather than a decoherence first channel since, for example, there is a possibility of filtering the channel storing a local one of the pair of entangled photons so as to improve the transmission channel characteristics and/or function.

Referring to FIG. 8, a portion of a network 810 including a tool/controller 820 as discussed herein is provided. A preferential south-north (SN) channel runs through a west node (W), whereas preferential north-south (NS) channel runs through a west node (E). The SN channel is selected because it is a modal loss first channel. The NS channel is selected because the impact of impact of decoherence in the selected combined channel NES is less than the impact of decoherence in the non-selected NWS channel.

Various embodiments find particular utility within the context of a quantum communications network, such as an optical mesh network comprising many quantum communications nodes or network elements, wherein each of the many nodes or network elements is connected to at least one other node or network element via a corresponding optical link therebetween (i.e., adjacent nodes or network elements). A connection between a source node and a destination node may traverse many intermediate nodes and links. Within the context of a quantum communications network, such a connection is deemed to have been made when the source node, destination node, and any intermediate nodes share an entangled photon pair.

Each node or network element N has an ability to generate an entangled pair of photons $A_N$ and $B_N$, keeping one photon (e.g., $B_N$) of the entangled pair locally (e.g., in a local storage channel or mechanism) while sending the other photon (e.g., $A_N$) of the entangled pair to a next node (N+1) via an optical link or transmit channel (from the perspective of node N) therebetween, and while receiving a photon $A_{N-1}$ from a prior node (N−1) via an optical link or receive channel (from the perspective of node N) therebetween. The next node (N+1) performs a Bell State Measurement on its kept photon $B_N$ and the received photon $A_{N-1}$, destroying those two photons and entangling the photon $B_{N-1}$ kept at node N−1, and the photon $A_N$ transmitted by node N to node N+1. In this manner, a source node NS and destination node ND are ultimately deemed to be connected by being in possession of respective entangled photons; namely, photon $B_{NS}$ at the source node NS and photon $A_{ND}$ at the destination node ND (or photon $A_{NS}$ at the source node NS and photon $B_{ND}$ at the destination node ND, depending upon which of the entangled photons is kept and which is transmitted).

Various embodiments are directed to choosing a path for transmitting optical communications/data through a mesh network such that at each of the nodes transmitting such optical communications/data, the optical link or transmit channel selected for such transmission preferentially comprises an optical channel characterized as a modal loss first channel rather than a decoherence loss first channel. In this manner, compensating filtering may be applied to an optical channel used to local keep or retain in a local storage channel one entangled photon (e.g., $B_N$ of an entangled pair of photons $A_N B_N$), while the other entangled photon (e.g., $A_N$ of the entangled pair of photons $A_N B_N$), is transmitted via a modal loss first optical channel benefitting from such compensating filtering.

FIG. 9 depicts a flow diagram of method for establishing a connection between a source node NS and a destination node ND within an optical mesh network in accordance with an embodiment. For purposes of this discussion it is assumed that one or more intermediate nodes form a part of the connection path. Further, that all of the node preferably select respective transmission paths (to the next node N+1 or destination node ND) that are characterized as modal loss first rather than decoherence first.

Step 910 comprises each optical node N within an optical network comprising a plurality of optical nodes, identifying preferred optical transmission channel(s) as those optical transmission channel(s) characterized as modal loss first optical transmission channels (optionally providing local optical channel modal loss compensation).

Step 920 comprises, at a source optical node NS, transmitting a first entangled photon $A_{NS}$ toward next optical node (N+1) via a preferred optical path while keeping in a local storage channel a second entangled photon $B_{NS}$.

Step 930 comprises, at each intermediate optical node N, receiving an entangled photon $A_{N-1}$ from a preceding node (source or intermediate), and performing a Bell State measurement on the kept intermediate node photon $B_N$ and the received photon $A_{N-1}$ to entangle thereby a transmitted intermediate node N photon $A_N$ and preceding node (N−1) photon $B_{N-1}$.

Step 940 comprises, at a destination optical node ND, receiving an entangled photon $A_{N-1}$ from a preceding node (source or intermediate), and performing a Bell State measurement on the kept destination node photon $B_{ND}$ and the received photon $A_{N-1}$ to entangle thereby destination node N photon $A_N$ and preceding node photon $B_{N-1}$, wherein a connection is established between source node NS and destination node ND by the entanglement of destination node photon $A_{ND}$ and the source node NS photon $B_{NS}$ (and any intermediate node stored photons $B_{(NS+1)}$ through $B_{(ND-1)}$.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, and to describe the actual partial implementation in the laboratory of the system which was assembled using a combination of existing equipment and equipment that could be readily obtained by the inventors, to thereby enable others skilled in the art to best utilize the invention and various embodiments with various modifications as may be suited to the particular use contemplated.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed is:

1. A method of characterizing an optical channel, comprising:
generating, using an entangled photon source (EPS), pairs of entangled photons, wherein first entangled photons A of the generated pairs of entangled photons are coupled to a first optical channel and second entangled photons B of the generated pairs of entangled photons are coupled to a second optical channel, wherein the first channel comprises an optical channel to be characterized and the second channel comprises a local storage optical channel;
detecting, at each of the first and second channels, respective entangled photons, wherein each entangled photon A is expressed in the basis ($h_A$, $h_{A'}$) and each corresponding entangled photon B is expressed in the basis ($h_B$, $h_{B'}$);
determining quantum coincidence data (QCD) of detected entangled photons A and B;
measuring quantum-correlation along ($h_A$, $h_{B'}$) and ($h_{A'}$, $h_B$) of the detected entangled photons using the determined QCD; and
responsive to ($h_A$, $h_{B'}$) being greater than ($h_{A'}$, $h_B$), characterizing the first channel as a modal loss first channel;
responsive to ($h_A$, $h_{B'}$) being less than ($h_{A'}$, $h_B$), characterizing the first channel as a decoherence first channel.

2. The method of claim 1, further comprising:
responsive to the first channel comprising a modal loss first channel, configuring the second channel to include a filtering element configured to compensate for modal loss.

3. The method of claim 1, wherein the method is performed at an optical node N within an optical network comprising a plurality of optical nodes, each optical node N transmitting optical information to at least one adjacent optical node N+1 using a respective N first channel.

4. The method of claim 1, wherein the pairs of entangled photons represent photon polarization qubits.

5. The method of claim 1, wherein the pairs of entangled photons represent orbital angular momentum qubits.

6. The method of claim 1, wherein the method is performed at each of a plurality of nodes in an optical network to identify preferred transmission channels thereat.

7. The method of claim 6, wherein a preferred channel at a node comprises modal loss first channel.

8. The method of claim 7, wherein in the absence of a node having associated with it a modal loss first channel, a preferred channel comprises a decoherence first channel having associated with it a lowest amount of decoherence.

9. The method of claim 6, further comprising establishing a connection between a source node SN and a destination node ND within the optical network by entangling photons from the source node, the destination node ND, and any nodes N between the source node SN and destination node ND.

10. The method of claim 9, wherein each node N is configured for receiving an entangled photon $A_{N-1}$ from a preceding node N−1, performing a Bell State measurement on a locally stored intermediate node photon $B_N$ and the received photon $A_{N-1}$ to entangle thereby a transmitted intermediate node N photon $A_N$ and preceding node (N−1) photon $B_{N-1}$.

11. A method of characterizing an optical channel at an optical node N configured for use within a network comprising a plurality of optical nodes wherein each optical node is coupled to at least one other optical node via respective optical channels, the method comprising:
generating, using an entangled photon source (EPS), pairs of entangled photons, wherein first ones A of the generated pairs of entangled photons are coupled to a first optical channel and second ones B of the generated pairs of entangled photons are coupled to a second optical channel, wherein the first channel comprises an optical channel to be characterized;
detecting, at each of the first and second channels, respective entangled photons, wherein each photon A is expressed in the basis ($h_A$, $h_{A'}$) and each corresponding entangled photon B is expressed in the basis ($h_B$, $h_{B'}$);
determining quantum coincidence data (QCD) of detected entangled photons A and B;
measuring quantum-correlation along ($h_A$, $h_{B'}$) and ($h_{A'}$, $h_B$) of the detected entangled photons using the determined QCD; and
responsive to ($h_A$, $h_{B'}$) being greater than ($h_{A'}$, $h_B$), characterizing the first channel as a modal loss first channel;
responsive to ($h_A$, $h_{B'}$) being less than ($h_{A'}$, $h_B$), characterizing the first channel as a decoherence first channel; and
selecting a modal loss first optical channel as a transmission channel.

12. The method of an optical node of claim 11, further comprising configuring the second channel to include a filtering element configured to compensate for modal loss.

13. The method of an optical node of claim 11, wherein in the absence of the node having associated with it a modal loss first channel, selecting as a transmission channel a decoherence first channel having associated with it a lowest amount of decoherence.

14. The method of an optical node of claim 11, wherein the optical node is configured to receive an optical communication from an input optical channel and transmit the received optical communication to the selected one of a plurality of output optical channels.

15. The method of an optical node of claim 11, wherein the optical node is configured for receiving an entangled photon $A_{N-1}$ from a preceding node N−1, performing a Bell State measurement on a locally stored intermediate node photon $B_N$ and the received photon $A_{N-1}$ to entangle thereby a transmitted intermediate node N photon $A_N$ and preceding node (N−1) photon $B_{N-1}$.

* * * * *